(12) United States Patent
Bowman et al.

(10) Patent No.: US 8,306,931 B1
(45) Date of Patent: Nov. 6, 2012

(54) DETECTING, CLASSIFYING, AND TRACKING ABNORMAL DATA IN A DATA STREAM

(75) Inventors: Christopher Bowman, Broomfield, CO (US); Duane DeSieno, LaJolla, CA (US)

(73) Assignee: Data Fusion & Neural Networks, LLC, Broomfield, CO (US)

( * ) Notice: Subject to any disclaimer, the term of this patent is extended or adjusted under 35 U.S.C. 154(b) by 741 days.

(21) Appl. No.: 12/462,634

(22) Filed: Aug. 6, 2009

(51) Int. Cl.
*G06E 1/00* (2006.01)
*G06E 3/00* (2006.01)
*G06F 15/18* (2006.01)
*G06G 7/00* (2006.01)
*G06N 3/04* (2006.01)

(52) U.S. Cl. ............... 706/27; 706/20; 706/26
(58) Field of Classification Search .......... 706/20, 706/22, 24–27
See application file for complete search history.

(56) References Cited

U.S. PATENT DOCUMENTS

| | | | | |
|---|---|---|---|---|
| 5,333,240 | A * | 7/1994 | Matsumoto et al. | 706/20 |
| 5,640,103 | A * | 6/1997 | Petsche et al. | 706/25 |
| 7,313,550 | B2 * | 12/2007 | Kulkarni et al. | 706/21 |
| 2006/0133699 | A1 * | 6/2006 | Widrow et al. | 382/305 |
| 2006/0180371 | A1 * | 8/2006 | Breed et al. | 180/197 |
| 2010/0179692 | A1 * | 7/2010 | Lu et al. | 706/19 |

OTHER PUBLICATIONS

Mounce, S.R. et al. "Sensor-fusion of hydraulic data for burse detection and location in a treated water distribution system". Information Fusion, vol. 4, Issue. 3, Sep. 2003, pp. 217-229. doi:10.1016/51566-2535(03)00034-4.*

Oliveira, A.L.I. et al. "Detecting novelties in time series through neural networks forecasting with robust confidence intervals". Neurocomputing, vol. 70, Issues 1-3, Dec. 2006, pp. 79-92. Online Jul. 8, 2006. doi:10.1016/j.neucom.2006.05.008.*

Miskin, J.W. "Ensemble Learning for Independent Component Analysis". Dissertation, University of Cambridge, Dec. 2000. 219 pages.*

Lathauwer, Lieven De, et al., "An introduction to independent component analysis",Journal of Chemometrics, 2000; 14: 123-149.

Perkins, Jeff H., et al.; Automatically Patching Errors in Deployed Software; Article; *SOSP*; Oct. 2009; ACM; Big Sky, Montana, USA.

* cited by examiner

*Primary Examiner* — Alan Chen
*Assistant Examiner* — Benjamin Buss
(74) *Attorney, Agent, or Firm* — Workman Nydegger

(57) ABSTRACT

The present invention extends to methods, systems, and computer program products for detecting, classifying, and tracking abnormal data in a data stream. Embodiments include an integrated set of algorithms that enable an analyst to detect, characterize, and track abnormalities in real-time data streams based upon historical data labeled as predominantly normal or abnormal. Embodiments of the invention can detect, identify relevant historical contextual similarity, and fuse unexpected and unknown abnormal signatures with other possibly related sensor and source information. The number, size, and connections of the neural networks all automatically adapted to the data. Further, adaption appropriately and automatically integrates unknown and known abnormal signature training within one neural network architecture solution automatically. Algorithms and neural networks architecture are data driven, resulting more affordable processing. Expert knowledge can be incorporated to enhance the process, but sufficient performance is achievable without any system domain or neural networks expertise.

23 Claims, 10 Drawing Sheets

DETECTING, CLASSIFYING, AND TRACKING ABNORMAL DATA IN A DATA STREAM

STATEMENT REGARDING FEDERALLY SPONSORED RESEARCH OR DEVELOPMENT

This invention was made with Government support under Contract No. FA9453-07-C-0003 awarded by the U.S. Air Force. The Government has certain rights in the invention.

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some environments, artificial neural networks ("NNs") are deployed to attempt to mimic the activities of the human brain and how it physically operates. The primary primitive data structure in the human brain is the neuron. There are approximately $10^{11}$ neurons in the human brain with $10^{15}$ connections. Extending from the neurons are tendril-like axons, which carry electrochemical signals from the body of the neuron. Thinner structures called dendrites protrude from the axons, and continue to propagate the signals from the neural cell bodies. Where the dendrites from two neurons meet, inter-neural signals are passed. These intersection points (about $10^{15}$ of them) are called synapses.

Neural networks are essentially computer programs that emulate some of the higher-level functions of the architecture described above. As in the human brain, there are neurons and synapses modeled, with various synaptic connection strengths (often referred to as weights) for each connected pair of neurons. However, similar to many computer programs (and unlike the brain) there is a specific set of input and output neurons for each problem and each net. These input and output neurons correspond to the input and output parameters of a traditional computer program, and the other neurons, along with the synapses and their weights, correspond to the instructions in a standard program. The organization of the neurodes in a neural network and the matrices of synaptic weights on their connections contain the "intelligence" of the system.

In many traditional NNs, the initial network configuration (number of hidden neuron layers, number of hidden neurons in each layer, activation function, training rate, error tolerance, training feedback, etc.) is chosen by a human system designer. There are typically no set rules to determine these network parameters, and trial and error based on experience is often the best way to configure a NN.

Some commercial programs use optimization techniques such as simulated annealing and genetic algorithms to find good network architectures. These NNs are usually fully connected NNs where each neurode on a layer has connections to all neurodes on the prior layer. The synaptic weights are usually initially randomized, so that the system initially consists of "white noise." Training pairs (consisting of an input vector and an output vector) are then run through the NN to the error between input and output vectors.

A correct case is a case where the input vector's network result is sufficiently close to the established output vector from the training pair. Initially the number of correct cases will be very small. The network training module then examines the errors and adjusts the synaptic weights in an attempt to increase the number of correctly assessed training pairs. Once the adjustments have been made, the training pairs are again presented to the NN, and the entire process iterates. Eventually, the number of correct cases will reach a local minimum, and the iteration can end.

Once the training is complete, testing is performed. When creating the database of training pairs, some of the data are withheld from the system. A sufficient portion appropriate subset of the available data is set aside to run through the trained NN, testing the system's ability to correctly assess cases that it has not trained on. If the testing pairs are assessed with success similar to the training pairs, and if this performance is sufficient, the NN is ready for actual use. If the testing pairs are not assessed with sufficient accuracy, the network architecture (e.g., layers, connections, and training parameters) must be adjusted by a human network designer, and the entire process is repeated until acceptable results are achieved. Thus, NN architecture configuration (even when using available commercial programs) typically requires significant input from a trained (human) NN system designer.

In application, NNs can be used to infer a function from observations. Thus, NNs are particularly useful in environments where the complexity of data or task makes human processing impractical, such as, for example, regression analysis, classification, and data processing. NNs can be used in system identification and control systems, game playing and decision making, pattern recognition, sequence recognition, medical diagnosis, data mining, data filtering, data clustering, etc. However, the usefulness of a NN in any environment is dependent in part on an appropriately configured NN architecture.

Unfortunately, the significant amount of human input required for configuring a NN architecture often limits the usefulness of NNs. In many environments, an optimal NN architecture is not static. That is, an optimal NN architecture can change over time (potentially but seldom with a high frequency) based on observed input data and relationships between different portions of the observed input data.

One example environment where optimal NN architecture can change over time is telemetry or state of health (SOH) measurand monitoring. Telemetry permits remote measurement and reporting of information from a system. Many systems (e.g., imagery, radar, satellite, factory, airplane automotive, etc.) are designed to output telemetry during operation. Telemetry can include among other things, diagnostic information (e.g., measurements) from sensors that monitor a system locally. For example, a circuit in a piece of factory equipment can include a voltage sensor to monitor the voltage difference between locations in the circuit. The sensor can relay the voltage difference to a communication module. The communication module then transmits the voltage difference over a data link (often using wireless communication) to a monitoring system and/or storage device. Telemetry is particularly useful when it is impractical (e.g., due to logistical, physical, time constraints, etc.) for a human to manual gather diagnostics or other data. For example, it may be dangerous for a human to physical monitor machines that process toxic chemicals, it is typically impossible to physical monitor objects in space, it may take an inordinate amount of time for an individual to measure large numbers of system parameters, etc. It should be noted that telemetry is not necessary for monitoring the state of health of a system. The methods described here could be used locally or remotely through telemetry.

State of health (SOH) measurands from these and other types of systems can be monitored to attempt to identify a value or combination of values within the SOH that indicates a potential problem in the operation of the underlying system. In monitoring a measurand, it's value would be considered abnormal when it fell outside a specified range of values. A simple monitoring system might have limits for each measurand. This simple approach typically misses abnormalities since the range for each measurand has to fairly large. Most real systems are complex and the normal range of values for a measurand will be dependent on the mode of operation of the system and values of other measurands. For example, a combination of increased voltage and heat in a piece of factory equipment can indicate that a circuit board within the equipment is malfunctioning and should be replaced. A experienced human monitoring SOH from the factory equipment may be able to recognize the malfunctioning circuit board and have it replaced before circuit board actually malfunctions (and potentially cascades to cause malfunctions in other components).

However, the sheer volume of SOH provided by some systems, such as, for example, ship, aircraft, or satellite systems, prevents a human from comprehending the SOH without computerized assistance. Thus, in some environments NNs are used to assist with monitoring SOH. The NNs can be configured to monitor telemetry to attempt to identify patterns that indicated possible system malfunctions. However, depending on the volume of SOH, normal computing techniques may not even be able to process and recognize all the different SOH values and interrelationships between the values in a SOH stream simultaneously.

As a result, Neural Networks can be configured to monitor different measurand values and measurand value relationships. However, as operational situations change it can be beneficial to switch between monitoring different groups of measurand values and measurand value relationships. Unfortunately, human involvement in configuring NN architectures (often compounded by the sheer volume of measurand data that is to be monitored) can limit how quickly optimized NN architectures can be adapted to address operational changes in a system.

BRIEF SUMMARY

The present invention extends to methods, systems, and computer program products for detecting, classifying, and tracking abnormal events and their relationships in a data stream. Embodiments of the invention include an integrated set of algorithms that facilitate detecting, characterizing and tracking abnormalities in real-time data streams based upon normal and abnormal historical data and on signature clusters labeled as predominantly normal or abnormal.

In some embodiments, the architecture of neural networks to detect abnormalities in performance of a monitored system is adapted to the historical data. A historical data set for the monitored operational system of interest is accessed. The historical data set includes a plurality of measurands indicative of measurements of prior system behavior. The plurality of measurands is used in training neural networks off-line, which are then used to monitor the ongoing performance of the system. Correlations between different measurands in the historical data set are computed during the off-line training. The correlations are used to automatically gather measurands together into one or more groups to facilitate automated neural network architecture configuration and to limit the overall size of the trainer neural network.

For each measurand, a measurand type is automatically determined from the historical data to determine who to treat the measurand in subsequent preprocessing and neural networks training. Each measurand is automatically scaled and normalized based upon the behavior of one or more of: the maximum value, the minimum value, the mean value, the standard deviation value, the slope value, and the frequency for the measurand over historical data windows.

A neural network is automatically configured for each correlated group of measurands. The neural network is configured to monitor the system for abnormalities related to the correlated group of measurands subsequent to scaling and normalizing of the behavior of these measurands over selected timer windows. Configuring a neural network includes selecting the number of the input layer nodes for the input layer of neural network and number of output layer nodes for the output layer. The number of hidden layer nodes is automatically adapted for the hidden layer of the neural network based on training convergence behaviors of the neural networks of the measurands in each correlated group of measurands. The size of the hidden layer can be constrained so that after training, errors between the input measurand and the corresponding output measurand are smaller for normal (e.g., typical) behavior of the system and larger for abnormal behavior of the system.

Automatic adaptation of the neural networks hidden layer nodes includes identifying a subset of the historical data for hidden layer sizing and optimizing the hidden layer nodes. Hidden layer node optimization is based on the sequence of behaviors of the neural network's training convergence for all measurands in the correlated group within the historical data subset. A hidden layer size search algorithm can be used to determine how the hidden layer size space is automatically searched or a manual selection can be made for any neural network.

One or more connections are assigned between input layer nodes and hidden layer nodes and one or more connections are assigned between the hidden layer nodes and the output layer nodes.

Neural networks are configured to detect abnormalities during performance of a monitored system. A suite of neural networks is defined and trained from historical data input. The suite of neural networks is configured to detect when a system abnormality has occurred during the ongoing performance of the system. The suite of neural network is defined by automatically adapting the number of hidden layer nodes for the hidden layer of each neural network based on training convergence behaviors of the measurands in a correlated group of measurands.

Automatic adaptation of hidden layer nodes includes identifying a subset of the historical data for hidden layer sizing. Automatic adaptation of hidden layer nodes is based on the sequence of behaviors of the training convergence for all measurands in the correlated group within the historical data subset. A hidden layer size search algorithm is used to efficiently determine how the hidden layer size space is searched.

The abnormality detection of each neural network is evaluated on both known normal and abnormal portions of historical data to estimate the probability of abnormality detection and false alarm rate. Abnormality signatures are generated for detected abnormalities in the portions of the historical data. The abnormality signatures are clustered based on similarities between abnormality signatures and then the clusters are probabilistically classified based upon known or conjectured abnormality cause types. Accordingly, when real-time data from the monitored system is processed, abnormal events occurring at the monitored system can be detected in real-time.

In further embodiments, neural networks are utilized to detect abnormalities during operation of a monitored system. Real-time telemetry data is received from the monitored system. The real-time telemetry data includes measurands indicative of the current health of the monitored system. The measurands are normalized for processing with neural networks. The normalized operands are processed by training a suite of neural networks. The suite of neural networks is configured to detect when a system abnormality has occurred based on the normalized measurands.

Each neural network was configured by automatically adapting the number of hidden layer nodes for the hidden layer of the neural network based on training convergence behaviors of the measurands in a correlated group of measurands in a historical data set for the monitored system. The historical data set includes a plurality of measurands indicative of measurements of prior performance for the system. Adapting of the number of hidden layer nodes includes identifying a subset of the historical data for hidden layer sizing. Adapting number of hidden layer nodes also includes optimizing the number of hidden layer nodes based on the sequence of behaviors of the training convergence for all measurands in the correlated group within the historical data subset. A hidden layer size search algorithm is used to efficiently determine how the hidden layer size space is searched.

An abnormality signature is detected in the real-time state of health (SOH) measurand data. The abnormality signature is then classified as an abnormality in operation of the monitored system based on similarities between the detected abnormality signature and an abnormality signature in a cluster of abnormality signatures representing an abnormal event.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
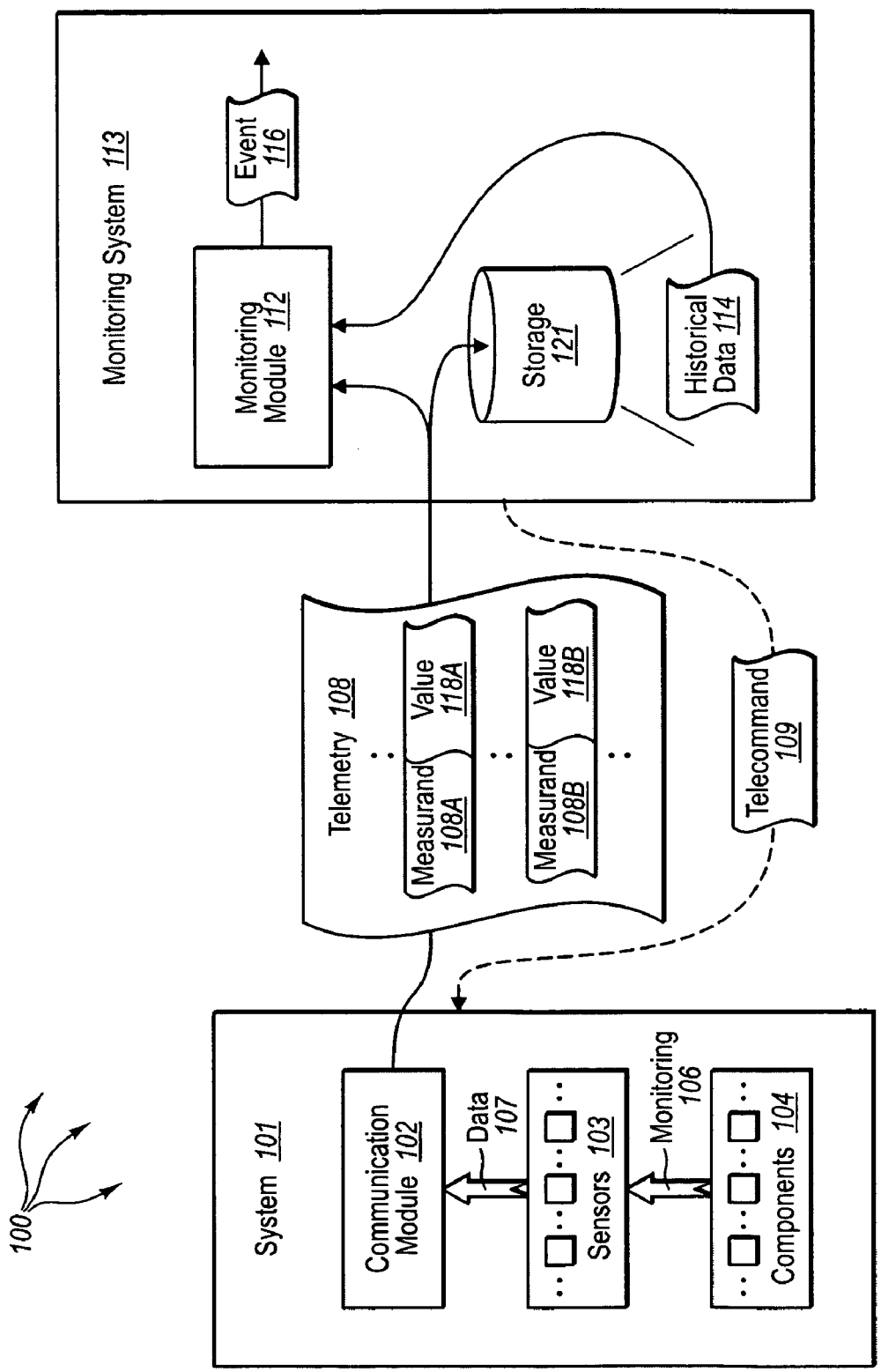
FIG. 1 illustrates an example computer architecture that facilitates remotely monitoring the performance of a system.

The present invention extends to methods, systems, and computer program products for detecting, classifying, and tracking abnormal data in a data stream. Embodiments of the invention include an integrated set of algorithms that facilitate detecting, characterizing and tracking abnormalities in real-time data streams based upon historical data. Embodiments of the invention include an integrated set of algorithms that facilitate detecting, characterizing and tracking abnormalities in real-time data streams based upon historical data. Some portions (and likely most) of the historical data can be labeled as predominantly normal and other portions of the historical data can be labeled as predominantly abnormal by a user.

In some embodiments, the architecture of neural networks to detect abnormalities in performance of a monitored system is adapted to the historical data. A historical data set for the monitored operational system of interest is accessed. The historical data set includes a plurality of measurands indicative of measurements of prior system behavior. The plurality of measurands is used in training neural networks off-line, which are then used to monitor the ongoing performance of the system. Correlations between different measurands in the historical data set, including normal and abnormal data, are computed during the off-line neural network architecture training. The correlations are used to automatically gather measurands together into one or more groups to facilitate automated neural network architecture configuration for system with larger numbers of measurands.

For each measurand, a measurand type is automatically determined from the historical data to determine how to treat the measurand in subsequent preprocessing and neural networks training. Each measurand is automatically scaled and normalized based upon the behavior of one or more of: the maximum value, the minimum value, the mean value, the standard deviation value, the slope value, and the frequency for the measurand over historical data windows.

A neural network is automatically configured for each correlated group of measurands. The neural network is configured to monitor the system for abnormalities related to the correlated group of measurands subsequent to scaling and normalizing of the behavior of these measurands over selected timer windows. Configuring a neural network includes selecting the number of the input layer nodes for the input layer of neural network and number of output layer nodes for the output layer. The number of hidden layer nodes is automatically adapted for the hidden layer of the neural network based on training convergence behaviors of the neural networks of the measurands in each correlated group of measurands. The size of the hidden layer can be constrained so that after training, errors between the input measurand and the corresponding output measurand are smaller for normal (typical) behavior of the system and larger for abnormal behavior of the system.

Automatic adaptation of the neural networks hidden layer nodes includes identifying a subset of the historical data for hidden layer sizing and optimizing the hidden layer nodes. This subset of historical data can contain examples of normal operation of the target system. This subset typically does not contain examples of abnormal behavior of the system, although a small percentage (less than 1%) of abnormal behavior can be present in the training data. Hidden layer node optimization is based on the sequence of behaviors of the neural network's training convergence for all measurands in the correlated group within the historical data subset. A hidden layer size search algorithm can be used to determine how the hidden layer size space is automatically searched or a manual selection can be made for any neural network.

One or more connections are assigned between input layer nodes and hidden layer nodes and one or more connections are assigned between the hidden layer nodes and the output layer nodes. In the some embodiments, for each correlated group, each hidden node has connections to a plurality (and potential all) input nodes and each output node will has connections to plurality (and potential all) hidden nodes. In an alternate embodiment, connections can be added as needed to increase the performance of the system. When connections are added in this way, hidden layer sizing is optional.

In other embodiments, neural networks are configured to detect abnormalities during performance of a monitored system. A suite of neural networks is defined and trained from historical data input. The suite of neural networks is configured to detect when a system abnormality has occurred during the ongoing performance of the system. The suite of neural network is defined by automatically adapting the number of hidden layer nodes for the hidden layer of each neural network based on training convergence behaviors of the measurands in a correlated group of measurands.

Automatic adaptation of hidden layer nodes includes identifying a subset of the historical data for hidden layer sizing. Automatic adaptation of hidden layer nodes, is based on the sequence of behaviors of the training convergence for all measurands in the correlated group within the historical data subset. A hidden layer size search algorithm is used to efficiently determine how the hidden layer size space is searched.

The abnormality detection of each neural network is evaluated on both known normal and abnormal portions of historical data to estimate the probability of abnormality detection and false alarm rate. Abnormality signatures are generated for detected abnormalities in the portions of historical data. The abnormality signatures are classified into clusters based on similarities between abnormality signatures. Accordingly, when real-time data from the monitored system is processed, abnormal events occurring at the monitored system can be detected in real-time.

In further embodiments, neural networks are utilized to detect abnormalities during performance of a monitored system. Real-time telemetry data is received from the monitored system. The real-time telemetry data includes measurands indicative of the current health of the monitored system. The measurands are normalized for processing with neural networks. The normalized operands are processed using a suite of neural networks. The suite of neural networks is configured to detect when a system abnormality has occurred based on the normalized measurands.

Each neural network was configured by automatically adapting the number of hidden layer nodes for the hidden layer of the neural network based on training convergence behaviors of the measurands in an optimized correlated group of measurands for a cut down representative historical data set for the monitored system. The cut down historical data set includes time periods indicative of measurement values of the full training set for the system. Adapting of the number of hidden layer nodes includes identifying a subset of the historical data for hidden layer sizing. Adapting number of hidden layer nodes also includes optimizing the number of hidden layer nodes based on the sequence of behaviors of the training convergence for all measurands in the correlated group within the historical data subset. A hidden layer size search algorithm is used to efficiently determine how the hidden layer size space is searched.

In some embodiments, after the neural network architecture has been adapted to the data and each of the neural networks weights have been trained (e.g., where each of these neural networks have been defined by the specific set of measurands whose behavior each neural network as learned), the same neural networks learning process is applied again with the initial set of neural network hidden node activation levels providing the role of the measurands as before. For example, the correlations are evaluated,
the hidden layer activations are batched into high correlation groups
the grouped hidden node activations are become the inputs to the next smaller set of 3-layer neural networks (which are potentially already scaled),
the new hidden layers of these derived neural networks higher in the hierarchy are optimized over a cut set of data, and
the weights in these derived neural networks with selected inputs repeated in many neural networks are trained using the hidden layer activations as training feedback.

This yields a smaller set of derived neural networks on top of the first set in a data-driven hierarchy of supervised neural networks. This process is then repeated a third and as many times as needed until the top layer in the neural networks hierarchy is exactly one neural network. The resulting data driven hierarchy of neural networks, most of which are feed-forward and some of which may be recurrent neural networks, provides the basis for abnormality detection via deep learning wherein all correlations between all measurands and hidden layer activations can be considered.

An abnormality signature is detected in the real-time telemetry data. The abnormality abnormality signature is classified as an abnormality in operation of the monitored system based on similarities between the detected abnormality signature and an abnormality signature in a cluster of abnormality signatures representing an abnormal event.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Within this description and the following claims, a "neural network" is defined as a mathematical or computational model based on biological neural networks. A neural network includes a group of artificial neurons using a connectionist approach to computation. A neural network can change its structure based on information passed through the neural network in a learning phase. Embodiments of the invention can utilize a wide variety of different types of neural networks including neural networks based on Principal Component Analysis (PCA) and more specifically Independent Component Analysis (ICA).

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture that facilitates remotely monitoring the performance of a system. Referring to FIG. 1, computer architecture 100 includes system 101 and monitoring system 113. A wired or wireless communication link can connect system 101 to monitoring system 113 and vice versa. System 101 and monitoring system 113 can communicate with one another over the communication link. For example, system 101 can send telemetry to monitoring system 113 (and potentially also receive telecommands from monitoring system 113 or other systems) over the communication link. Likewise, monitoring system 113 can receive telemetry from system 101 (and potentially also send telecommands to system 101 over the communication link.

System 101 can be any of wide variety of different types of system, such as, for example, a factory system, an agricultural system, a motor vehicle system, a medical system, a radar system, a satellite system, a rocket system, an aircraft system, a maritime system, a defense system, etc. System 101 can include a plurality of different components 104 that interoperate to provide the functionality of system 101. Components 104 can include any of a variety of different components, such as, for example, one or more of electronic, electrical, computer, chemical, structural, pneumatic, mechanical, and hydraulic components. For example, a variety of different components can be configured to provide a system that operates on a satellite.

Sensors 103 are configured to monitor 106 the operating characteristics of components in components 104. Thus, sensors 103 can also include any of a variety of different types of sensors such as, for example, electrical sensors, mechanical sensors, position sensors, motion sensors (speed and acceleration), pressure sensors, temperature sensors, magnetic sensors, chemical sensors, etc. Sensors 103 can include digital and/or analog electronic components for converting sensed operating characteristics into data 107 that can be compatible transferred over the a data link. Sensors 103 send data 107 to communication module 102 (which also has components included in components 104).

Communication module 102 can package data 107 into telemetry 108. Telemetry 108 can be sent to monitoring system 113 using a compatible telemetry Telemetry 108 can includes a plurality of measurands (108A, 108B, etc.) and corresponding values (values 118A, 118B, etc). A measurand identifies a particular operational characteristic of system 101. For example, measurand 108A can represent a voltage from a specified circuit in components 104 and value 118A the value of the voltage (e.g., in Volts). Similarly, measurand 108B can represent a temperature at the specified circuit and value 118B the value of the temperature (e.g., in degrees).

Monitoring system 113 can receive telemetry 108. Monitoring module 112 can monitor telemetry 108 in essentially real-time. From the measurands and values in telemetry 108, monitoring module 112 can attempt to identify possible abnormalities in the operation of system 101. Monitoring module 112 can include computer software, artificial intelligence, other logic, etc, to assist a user of monitoring system 113 in identifying abnormalities. When a combination of measurand values indicates a possible abnormality, monitoring module 112 can output an event, such as, for example, event 116.

Monitoring system 113 can also store telemetry 108 in storage 121. Telemetry 108 can be accumulated in historical data 114. Monitoring system 112 can replay historical data 114 to look for previously abnormalities at system 101. Monitoring system 113 can also use known and unknown abnormalities in historical data 114 to train the artificial intelligence or logic of monitoring module 112.

In some embodiments, system 101 includes components that can receive commands over a data link. Thus, monitoring system 113 can send telecommands, such as, for example, telecommand 109, to system 101. From the instructions in a telecommand, a component of system 101 can alter its operational characteristics, such as, for example, to reboot, change alignment, increase/decrease pressure, increase/decrease speed, change targets, etc.

System 101 can operates in an environment where it is impractical, dangerous, or even virtually impossible for a human to survive. For example, system 101 can operate in a battlefield environment, near hazardous materials, in a deep water environment, in space environment, in an underground environment, on an object travelling at high speeds, etc. Thus, there may be no way for a human to be within close enough physical proximity to system 101 on an ongoing basis (or at all) to otherwise observe the operation of system 101 or obtain measurements related to the operation of system 101.

Figure 2A:
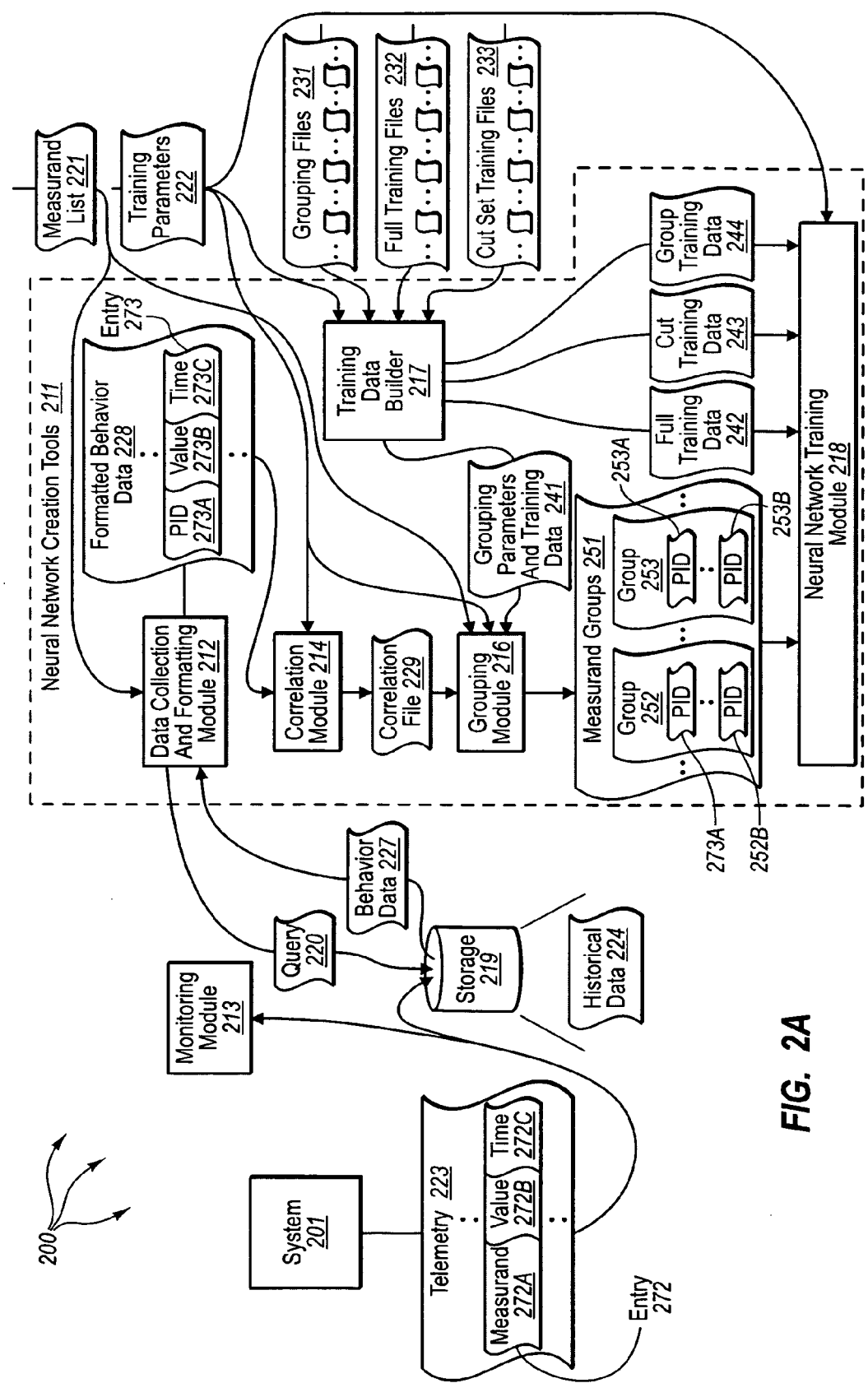
FIG. 2A illustrates an example computer architecture that facilitates configuring neural networks for remotely monitoring the performance of a system.

FIG. 2A illustrates an example computer architecture 200 that facilitates configuring neural networks for remotely monitoring the performance of a system. Generally, computer architecture 200 includes system 201, monitoring module 293, storage 219, and neural network creation tools 211.

System 201 can be a system as previously described, such as, for example, a satellite system, that outputs telemetry 223 over a wireless link. Telemetry 223 can include telemetry entries (e.g., entry 272). Each telemetry entry identifies a measurand and the value of the measurand at a specified time (e.g., measurand 272A, value 272B, time 272C). Monitoring module 293 can monitor telemetry 223 in essentially real-time. Telemetry 223 can also be accumulated in historical data 224 stored at storage 219. Neural network creation tools 211 can utilize historical data to configure neural networks to monitor system 201. The neural networks can be utilized at monitoring module 293 to assist a human user in detecting potential abnormalities in the operation of system 201.

Neural network creation tools 211 include data collection and formatting module 212, correlation module 214, grouping module 216, training data builder 217, and neural network training module 218. Data collection and formatting module 212 is configured to receive a user generated measurand list containing a list of measurands represented in historical data 224 (e.g., specified measurands an analyst is interested in). Upon receiving a measurand list, data collection and formatting module 212 can access historical data 224 and retrieve telemetry entries corresponding to the measurands in the measurand list. Data collection and formatting module 212 can also format telemetry entries to facilitate correlation between measurands.

Correlation module 214 is configured to receive formatted telemetry entries. From the formatted entries, correlation model 214 correlates each measurand with every other measurand in the measurand list. Correlation module 214 then outputs one or more files indicating the correlation between each measurand and every other measurand in the measurand list.

Grouping module 216 is configured to receive correlation files from correlation module 215. From the correlation file, group module 216 can grouped the measurands from the measurand list into a plurality of different measurand groups. Group module 216 can make the measurand groups available to neural network training module 218 for use in training neural networks.

Training data builder 217 is configured to build training data for training neural networks. Training data builder 217 can combine and format data form a variety of training files into a set of training data for training a neural network. Training data builder 217 can building grouping parameters by combining and formatting one or more grouping files into grouping parameters. Grouping module 216 can use the grouping parameters to group measurands into measurand groups.

Training data builder 217 can also build training data by combining and formatting one or more training files into training data. Training data builder 217 can build full sets of training data from training files. Training data builder 217 can also build cut (or abbreviated) sets of training data from a subset of the training files (or even different training files than those) used to build a full training set.

Neural network training module 218 is configured to receive measurand groups and training sets. From the measurand groups and training sets, neural network training module 218 can output one or more neural networks for detecting abnormalities in historical data 224 (as well as telemetry 223). Neural networks can be loaded at monitoring module 293 to assist analyst in monitoring the performance of system 201. Neural networks can also be loaded at a testing module and run against historical data 224 to evaluate performance prior to loading at monitoring module 293.

Figure 2B:
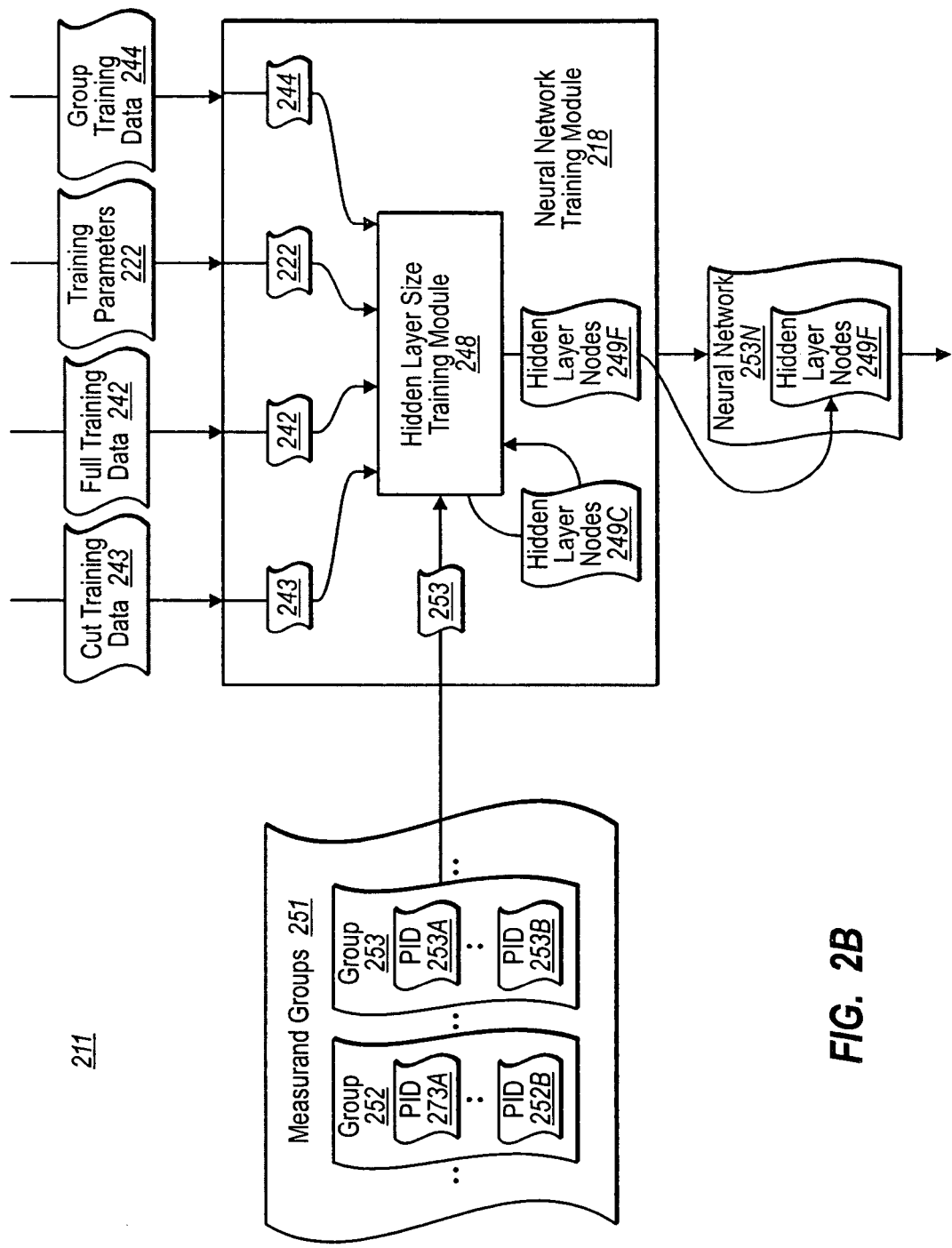
FIG. 2B illustrates another view of the example computer architecture in FIG. 2A that facilitates configuring neural networks for remotely monitoring the performance of a system.

Referring briefly to FIG. 2B, FIG. 2B illustrates another view of the example computer architecture in FIG. 2A that facilitates configuring neural networks for remotely monitoring the performance of a system. As depicted in FIG. 2B, neural network training module 218 includes hidden layer size training module 248. Hidden layer size training module 248 is configured to determine an appropriate hidden layer size for one or more neural networks for monitoring corresponding groups of measurands in historical data 224 and/or telemetry 223. Hidden layer size training module 248 can determine an appropriate hidden layer size for a neural network for a group of measurands based on based on training data and historical data for the group of measurands. Hidden layer size training module 248 can utilize a hidden layer size algorithm that efficiently determines how the hidden layer size space is to be searched.

Different types of parameters can be used to configure neural network training. Parameters can be included in a general parameters file, such as, for example, training parameters 222 as well as in system specific parameter files, such as, for example, grouping files 231 and training files included in full training files 232 and/or in cut set training files 233. Generally, different types of training data, such as, for example, cut training data 243, full training data 242, group training data 244, can be used to train neural networks. Cut, full, and group training sets can be used for larger training sets to decrease the time required for training.

Figure 3:
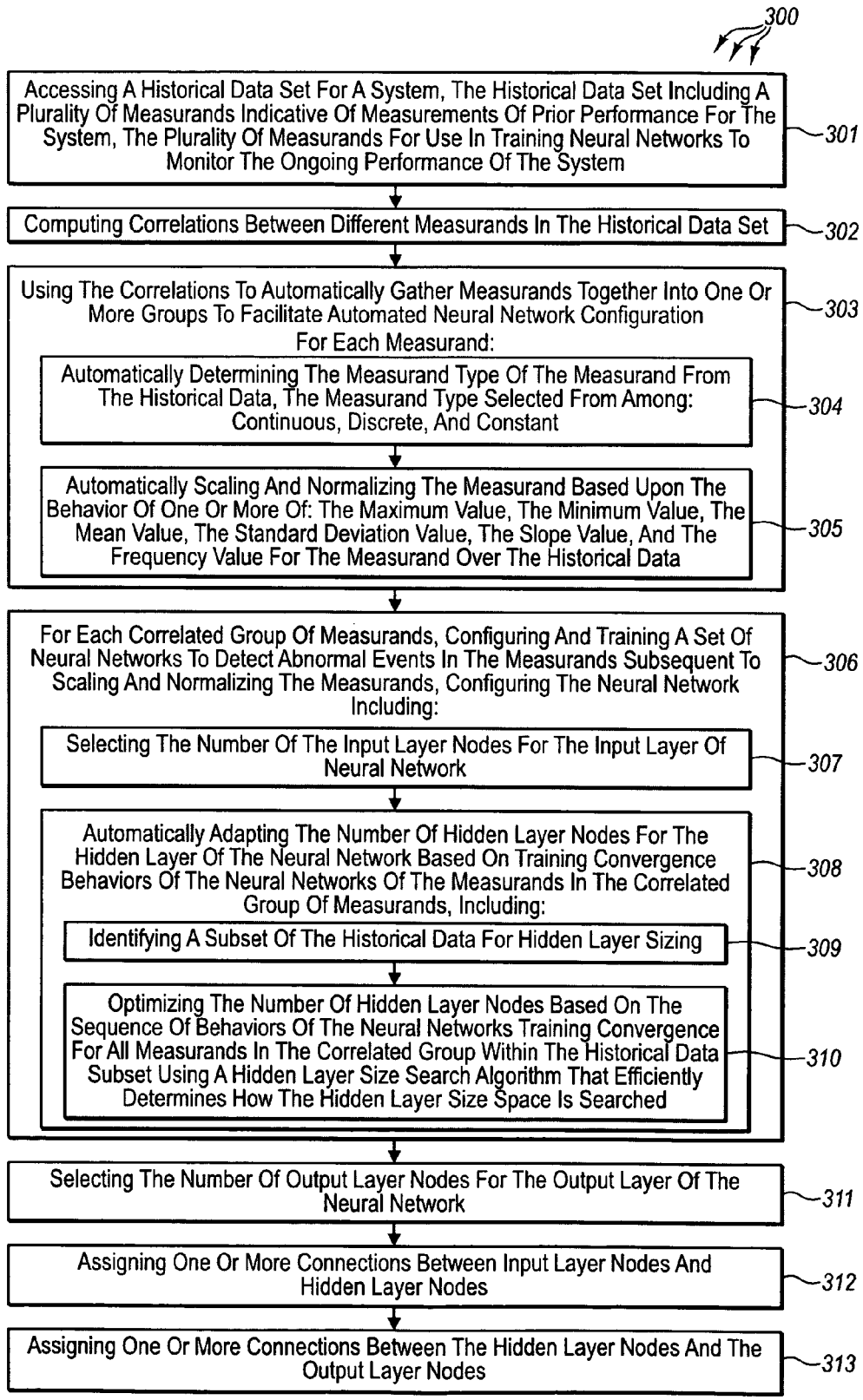
FIG. 3 illustrates a flow chart of an example method for adapting the neural architecture of neural networks to detect abnormalities in performance of a monitored system.

FIG. 3 illustrates a flow chart of an example method 300 for adapting the neural architecture of neural networks to detect abnormalities in performance of a monitored system. The method 300 will be described with respect to the components and data in computer architecture 200.

Method 300 includes an act of accessing historical data set for a system, the historical data set including a plurality of measurands indicative of measurements of prior performance for the system, the plurality of measurands for use in training neural networks to monitor the ongoing performance of the system (act 301). For example, data collection and formatting module 212 can receive measurand list 221. Measurand list 221 can include list of measurands in historical data 224. Measurand list 221 can include various fields to identify measurands and for storing subsequent scaling and normalization data for measurands. In some embodiments, measurand list 221 includes one or more rows of data (e.g., a delimited text file) having the following data fields:

| Identifier Field | A field for storing unique identifier for a measurand within a set of historical data or telemetry. |
| --- | --- |
| Scaling Field | A field for storing values representing a measurand type selected from among continuous (C), discrete (B), and constant. |
| Friendly Name Field | A field for storing a value for a friendly name used to identify the measurand. |
| Group Field | A field for storing a value representing a group the measurand is a member of. This field can be set to a value that permits updating by a grouping module. Alternately, the field can be set to a value that fixes the measurand to a specified group. Since a measurand list can be user generated, this permits a user to specify groups for measurands |
| Type Field | A field for storing value representing the data type of the measurand |
| Subsystem | A field for storing a value representing a subsystem identifier that identifies a subsystem corresponding to the measurand |

Column 2 can be initialized to any value of even left blank, since it is likely to be overwritten with scaling and/or statistical data. Column 4 can be set to a fixed group name or initialized to another value for later automated group assignment. For example, a measurand list can contain:

| −1 | I | RECNUM | NONE | FLOAT | Time |
| --- | --- | --- | --- | --- | --- |
| −1 | I | TIME | NONE | FLOAT | Time |
| −1 | I | SINTOD | NONE | FLOAT | Time |
| −1 | I | COSTOD | NONE | FLOAT | Time |
| 5 | B | ABC | GRP001 | STATUS | SCT |
| 6 | C | DEF | B | FLOAT | COMM |
| 15 | C | GHIJ | B | FLOAT | COMM |
| 488 | B | KLMNOP | B | FLOAT | COMM |
| 45 | B | QRS | B | STATUS | COMM |
| 639 | C | TUVW | B | FLOAT | COMM |

Identifiers in measurand list 221 can match measurands in the entries of telemetry 223 (and thus also those stored in historical data 224). Data collection and formatting module can use a measurand list to access values for measurands form historical data 224. For example, data collection and formatting module use measurand list formulate query 220. Query 220 can be a query for the values of the measurands listed in measurand list 221 over a specified time period. Data collection and formatting module 212 can issue query 220 to storage 219 to access the values for the measurands from historical data 224. In response, storage 219 can return behavior data 227, indicating the values of the measurands during the specified time period. Data collection and formatting module 212 can receive behavior data 227 from storage 219.

Data collection and formatting module 212 can format behavior data 227 into formatted behavior data for compatibility with correlation module 214. Formatted data can include entries of the format PID, Value, Time. For example, entry 273 can include HD 273A, Value 273B, and Time 273C.

Method 300 includes an act of computing correlations between different measurands in the historical data set (act 302). For example, correlation module 214 can receive formatted behavior data 228. Based on formatted behavior data, correlation module 214 can correlate each measurand represented in formatted behavior data 228 with every other measurand represented in formatted behavior data 228. Correlation module 214 output correlation file 229 indicate the correlations between measurands. In some embodiments, a correlation file is created per measurand. Thus, a correlation file for a measurand can include a number of entries indicating the measurand's correlation to every other measurand in measurand list 221. Accordingly, for each measurand, a correlation file can include entries of the format:

| Identifier Field | A field for storing a unique identifier identifying another measurand. |
| --- | --- |
| Correlation Field | A field for storing a correlation value indicating the correlation between the measurand for which the measurand file is generated and the measurand identified by the unique identifier in the identifier field. |
| RSQ Field | A field for storing a value equal to the correlation value squared. (i.e., correlation value$^2$) |
| Slope Field | A field for storing the linear regression slope between the measurand for which the measurand file is generated and the measurand identified by the unique identifier in the identifier field. |
| Variable Name Field | A friendly name for the measurand identified by the unique identifier in the identifier field. |

Correlation can be calculated using statistical correlation between X and Y values according the equation: $E\{[(x-mx)(y-my)]/\text{sigma}(x)\,\text{sigma}(y)\}$, where mx and my are the means of x and y, respectively and the sigmas are the standard deviations of x and y, respectively.

Thus, for a variable ABC a correlation file can contain:

| | Correlations for Output 1: ABC | | | |
|---|---|---|---|---|
| INPUT | Correlation Value | RSQ Value | Slope Value | Variable Name |
| 5 | 1 | 1 | 1 | ABC |
| 6 | 1 | 1 | 0.999998 | DEF |
| 15 | 0.824507 | 0.679812 | 0.679904 | GHIJ |
| 488 | 0.654761 | 0.428712 | 0.457079 | KLMOP |
| 45 | −0.32018 | 0.102512 | −0.07706 | QRS |
| 639 | 0.306844 | 0.094153 | 0.099409 | TUVW |

In other embodiments, a single or reduced number of correlation files are created. In these embodiments, an addition field in the correlation file or files can be used to identify the measurand a correlation is for. In other embodiments, the correlation file may be a binary file storing the input and output variable numbers and the correlation value.

Method 300 includes an act of using the correlations to automatically gather measurands together into one or more groups to facilitate automated neural network configuration (act 303). For example, grouping module 216 can group measurands from measured list 221 into measurand groups 251. Grouping module can receive correlation file 229 (and correlation files for other measurands), measured list 221, grouping parameters & training data 241, and training parameters. From correlation file 229 (correlation files for other measurands), measurand list 221, grouping parameters & training data 241, and training parameters 222, grouping module 216 can formulate measurand groups 251.

For example, training parameters 222 or grouping parameters & training data 241 can indicate one or more of: an initialization algorithm, maximum group size (e.g., 250), minimum group size (e.g., 60), RSQ threshold (e.g., 0.09), epsilon (e.g., 0.1), and maximum iterations (e.g., 2,000,000). The grouping algorithm can be used to maximize of the correlation between variables within a group while minimizing the correlation between variables in different groups. In some embodiments, variables are partitioned into groups. In other embodiments, the neural network outputs can be partitioned while some variables are e used as inputs by more than one group. In some embodiments, a baseline initialization algorithm is used. A baseline initialization algorithm can include the following:

1. Start with measurands in unmarked list ordered by subsystem and n=1
2. A: Check for the next measurand that is unmarked. If not, go to B.
3. If so, mark as tentative this measurand and all measurands whose RSQ>RSQ threshold compared this measurand.
// Determine if current number of measurands in group is within minimum and maximum group size thresholds.
4. Check if n+number of tentatives (or the full marked measurands)>minimum group size.
5. If not, set full marked measured as in group and go to A.
6. If so, check if n+number of tentatives>maximum group size.
7. If not, set full mark measurands as in group and increment to next group. Go to A
// If number of measurands exceeds maximum group size mark as hold
8. If so, change all tentative marks to hold marks and go to A.
9. B: If any measurand fully marked as in group, increment group.
10. Check for tentative or hold marked measurands, if not, end.
// Tighten correlation threshold for group inclusion
11. If so, remove these marks and set RSQ threshold to RSQ threshold+epsilon and recheck measurand correlations.
12. If not, then go to A.
13. If so, then full mark the next unmarked measurand as in group n and continue doing so until group n is >minimum group size.
14. Increment group and then go to A.

The baseline initialization algorithm can assume a baseline set of correlation relationships among measurands, a sufficient number, and good min and max values. When this is not the case, there is a higher likelihood of more than one group having a size<group minimum size. These groups can be clustered together to form initialization groups that meet the min and max group size constraints.

If the baseline initialization algorithm results in undesirable groups, initialization can be rerun using a random initialization algorithm. Random initialization divides the measurands into groups approximately equal in size to close to the average of the maximum group size and the minimum group size.

For either type of initialization, improvement on the initial grouping is made using a pair wise replacement algorithm. A pair wise replacement algorithm can include the following:

1. Compute average RSQ value over all measurands within each group using the initial grouping and set i=1.
2. A: draw 2 measurands at random, M and N.
3. Score the following alternative groupings:
4. Switch groups for M and N measurands
5. Add N to M's group
6. Add M to N's group
7. Select the new group assignment with the highest overall correlation score>current score, not considering additions to a group with max group size already
8. Set i=i+1.
9. Is i>maximum iterations
10. If not, go to A.
11. If so, end.

Further, any constant variables, if there are any, can be grouped into the same group (e.g., group 1).

A measurand list, for example, measurand list 221 can be updated to indicate group assignments. For example, a grouped measurand list can contain:

| 5 | B | ABC | GRP001 | STATUS | SCT |
|---|---|---|---|---|---|
| 6 | C | DEF | GRP002 | FLOAT | COMM |
| 15 | C | GHIJ | GRP002 | FLOAT | COMM |
| 488 | B | KLMNOP | GRP011 | FLOAT | COMM |
| 45 | B | QRS | GRP002 | STATUS | COMM |
| 639 | C | TUVW | GRP011 | FLOAT | COMM |

For each measurand, automatically gather measurands together into one or more groups includes an act of automatically determining the measurand type of the measurand from the historical data, the measurand type selected from among: continuous, discrete, and constant (act 304). For each measurand, automatically gather measurands together into one or more groups includes an act of automatically scaling and normalizing the measurand based upon the behavior of one or more of: the maximum value, the minimum value, the mean value, the standard deviation value, the slope value, and the frequency value for the measurand over the historical data (act 305). For example, grouping module 216 can also include functionality to formulate statistical and scaling information for measurands in measurand list 221. The scaling and statistical information for measurands in measurand list 221 can include one or more of a derived mean, standard deviation, slope, and frequency temporal measurands where the continuous, discrete, or constant type normalization.

Parameters from grouping parameters & training data 241 and/or training parameters 222 can be used to determine measurand type and generate statistically information for scaling and normalization of a measurand. Parameters can include a constant measurand threshold ("CMT") (e.g., 100), a binary measurand threshold ("BMT") (e.g., 100), and a frequency measurand threshold ("FMT") (e.g., 25).

The CMT, BMT, and FMT parameters can be used as follows on measurand values for measurands within a portion of historical data, such as, for example, in behavior data 227:

If the stdev=0 or max=min then scale max/min and no temporal statistics. If [max−min]/stdev>CMT then scaled as discrete and do not calculate temporal statistics.

For the measurands that are Status or INT (and [max−min]/stdev<Binary Measurand Threshold, then scale Maxmin with temporal statistics (as specified other general or system specific parameters) and scale using the FMT test below.

For measurands that are float and FMT<[max−min]/stdev<Binary BMT, then scale Max/Min and no temporal measurands are derived.

Scale the remaining measurands as continuous (i.e., considered as if float measurands) with mean & standard deviation and generate temporal measurand statistics using the FMT test for temporal statistics. Namely, all measurands with FMT<[max−min]/std will not have temporal measurands derived, since their variations are not sufficiently high.

CMT, BMT, and FMT can be specified in a variety of different ways. In some embodiments, CMT, BMT, and FMT are specified for the scaling and generation of temporal measurands for each static measurand as follows:

1. Mark the measurands in the measurand list as Status or INT that you want to encourage flagging as abnormal when they exceed their max or min in the training set, and in addition their "very rare" values (i.e., where max-min]/stdev>BMT) that are also considered anomalies. Mark the rest as Float.
2. Select BMT at the standard deviation level for which lesser variations (i.e., BMT<[max−min]/stdev) are considered as "rare, but normal" (i.e., no flagging is desired unless out of pattern).
3. Select FMT at or just above the YFact value as the region below which learning of continuous variations is desired and that variations are significant enough to desire temporal measurands to be derived.
4. Select CMT>BMT to enable continuous scaling of measurands with "very rare" values in the training set between these two levels for which abnormality flags are desired and more sensitivity to their normal behavior is desired. Set CMT=BMT so that all measurands with "very rare" anomalous values will be scaled as discrete and for which less sensitivity of the neural networks is desired.

Measurand scaling functions for continuous (C) and discrete (B) measurands can be as follows:

Continuous Measurands Scaling
Oper=SCALE_MEANSTD(1) [values scaled by the standard deviation; mean at zero]
Oper=BI_SQUASH(cbt) [to map to cbt sigma, such as, for example, 0.9]
Maxmin Measurands Scaling
Oper=SCALE_MAXMIN(0.9) [values scaled with max 0.9 and min−0.9]
Oper=BI_SQUASH(0.9) [so that 0.9 maps to 0.9 max]
Standard Deviation Measurands Scaling
Oper=W_STDDEV(Swin)
Oper=SCALE_MEANSTD(1)
Oper=BI_SQUASH(cbt)
Slope Temporal Measurands Scaling
Oper=W_SLOPE(Mwin)
Oper=SCALE_MEANSTD(1)
Oper=BI_SQUASH(cbt)
Frequency Temporal Measurands Scaling
Oper=SET_PAR1(0.0150431)
Oper=W_SLOPECHANGES(Fwin) [counts number of slope state changes]
Oper=SCALE_MAXMIN(0.9)
Oper=BI_SQUASH(0.9)

CBT=Yfact is Continuous Bi-Squash Threshold (e.g., with baseline=20). Thus, for the bi-polar squashing function cbt sigma (e.g., 0.9) maps to the Continuous Bi-Squash Threshold (e.g., 20 sigma point for continuous measurands). Swin, Fwin, & Mwin are the NN temporal measurand window sizes specified in parameters files file (e.g., baseline=12, 12, & 2). The Set_Par1 operation gets the measurand standard deviation from the parameter files. This is the value which is multiplied by the frequency hysteresis to determine if the frequency state should be changed.

For each correlated group of measurands, method 300 includes an act of configuring and training a set of neural networks to detect abnormal events in the measurands subsequent to scaling and normalizing the measurands (act 306). For example, transitioning now to FIG. 2B, neural network training module 218 can access measurand groups 251, full training data 242, cut training data 243, group training data 244, and training parameters 222. From one or more of measurand groups 251, full training data 242, cut training data 243, group training data 244, and training parameters 222, neural network training module 218 can generate a neural network per measurand group. That is, neural network training module 218 can generate a neural network for group 252, 235, etc. The neural networks can be used to detect abnormal events in the groups of measurands they are configured and trained to monitor, Neural network configuration includes an act of selecting the number of the input layer nodes for the input layer of neural network (act 307). The number of input layer nodes for an input layer can be selected based on the number of measurands in the measurand group. For example, the number of input layer nodes for group 253 can be matched to the number of PIDs in group 253 (e.g., from 253A to 253B).

Neural network configuration includes an act of automatically adapting the number of hidden layer nodes for the hidden layer of the neural network based on training convergence behaviors of the neural networks of the measurands in the correlated group of measurands (act 308). For example, hidden layer size training module 248 can adapting a number of hidden layer nodes for a neural network for group 253 based on training convergence behaviors between the measurands in group 253.

Automatic adaptation includes an act of identifying a subset of the historical data for hidden layer sizing (act 309). For example, hidden layer size training module 248 can identifying cut training data 243 (a portion of historical data historical data 224). Cut training data 243 can include input values and resulting corresponding output values that are used to train a neural network. For example, cut training data 243 can include known normal data, known abnormal data, and unknown data used to train a neural network for recognizing abnormalities in the measurands of group 253.

Automatic adaptation also includes an act of optimizing the number of hidden layer nodes based on the sequence of behaviors of the neural network's training convergence for all measurands in the correlated group within the historical data subset using a hidden layer size search algorithm that efficiently determines how the hidden hidden layer size space is searched (act 310). For example, hidden layer size training module 418 can optimize the number of hidden layer nodes for group 253. Optimization of hidden layer size is based on the sequence of behaviors of the neural network's training convergence for all measurands in group 253 within cut training data 243.

Hidden layer size calculation can include initial training based on a cut set of training data. Subsequent to initial training, hidden layer size calculation can include full training based on a full set of training data. Initial training based on a cut set of training data can be used to approximate an optimal hidden layer size based on a reduced data. Initial training on the cut set of data is more efficient and conserves processing resources. After a hidden layer size is approximated from the cut data, the hidden layer size can be refined from full training using the full data.

Generally, hidden layer node size can be calculated from hidden layer sizing parameters including in a system specific parameters file, such as, for example, some subset of: cut training data 234, full training data 242, group training data 244, and a more global parameters file, such as, for example, training parameters 222. The variable Hsize can be used to represent hidden layer size. Hidden layer sizing parameters can include:

InitTrnIterations. Stop initial training during Hsize search if number of iterations is less than InitTrnIterations (e.g., 200).

InitIterThres. Reduce Hsize if training stops prior to InitIterThres (e.g., 50) iterations.

InitTrnError. Stop initial training during Hsize search if RMS less than InitTrnError (e.g., 0.01).

FinalTrnIterations. Stop final training if number iterations reach FinalTrnIterations (e.g., 300) iterations.

FinalTrnError. Stop final training if RMS is less than FinalTrnError (e.g., 0.004)

MaxFraction. Stop increasing Hsize first time Hsize>than MaxFraction of output layer size (e.g., 0.90)

Figure 6A:
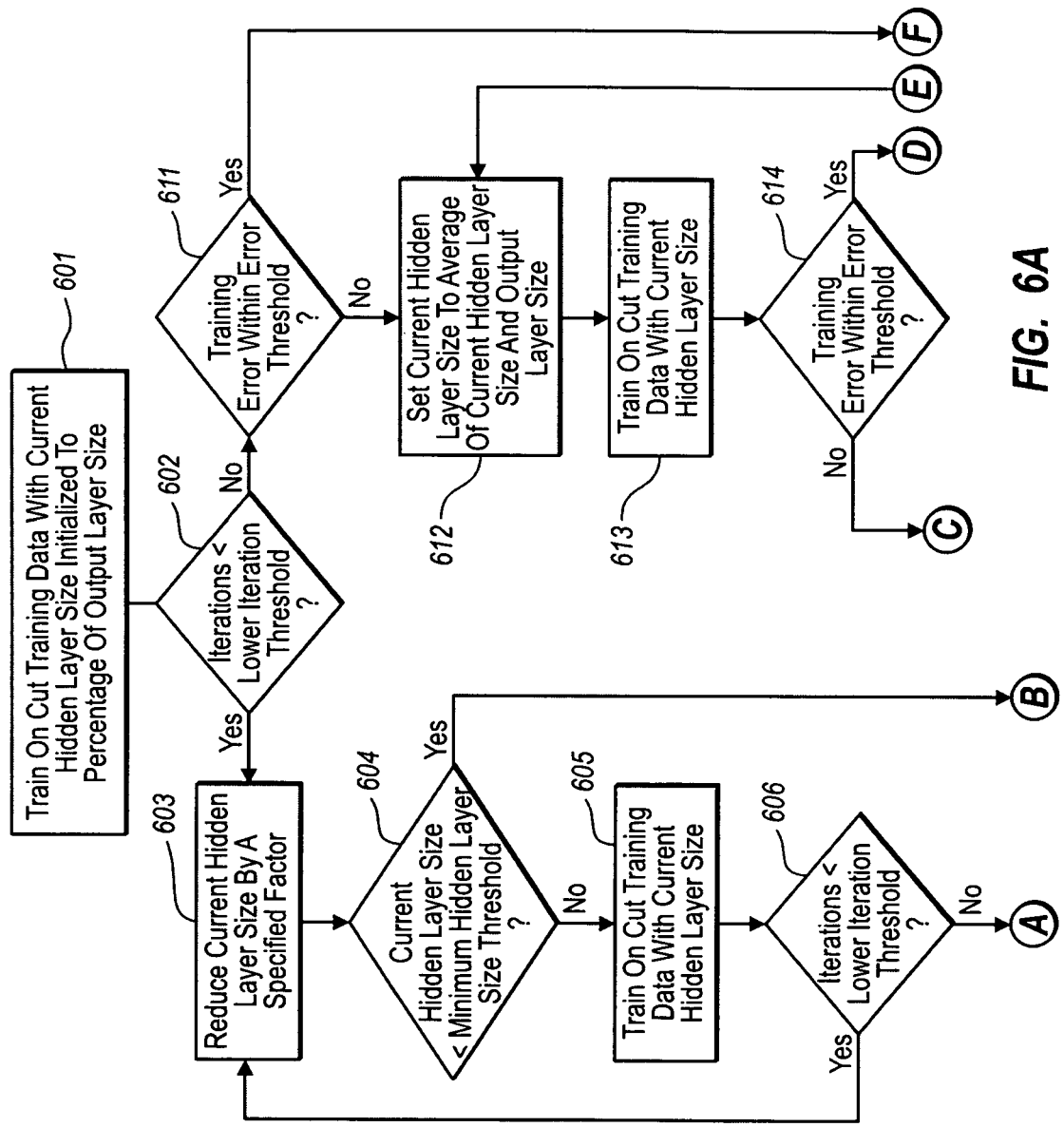
FIGS. 6A and 6B illustrate a flow chart of an example method for automated hidden layer sizing and training.
Figure 6B:
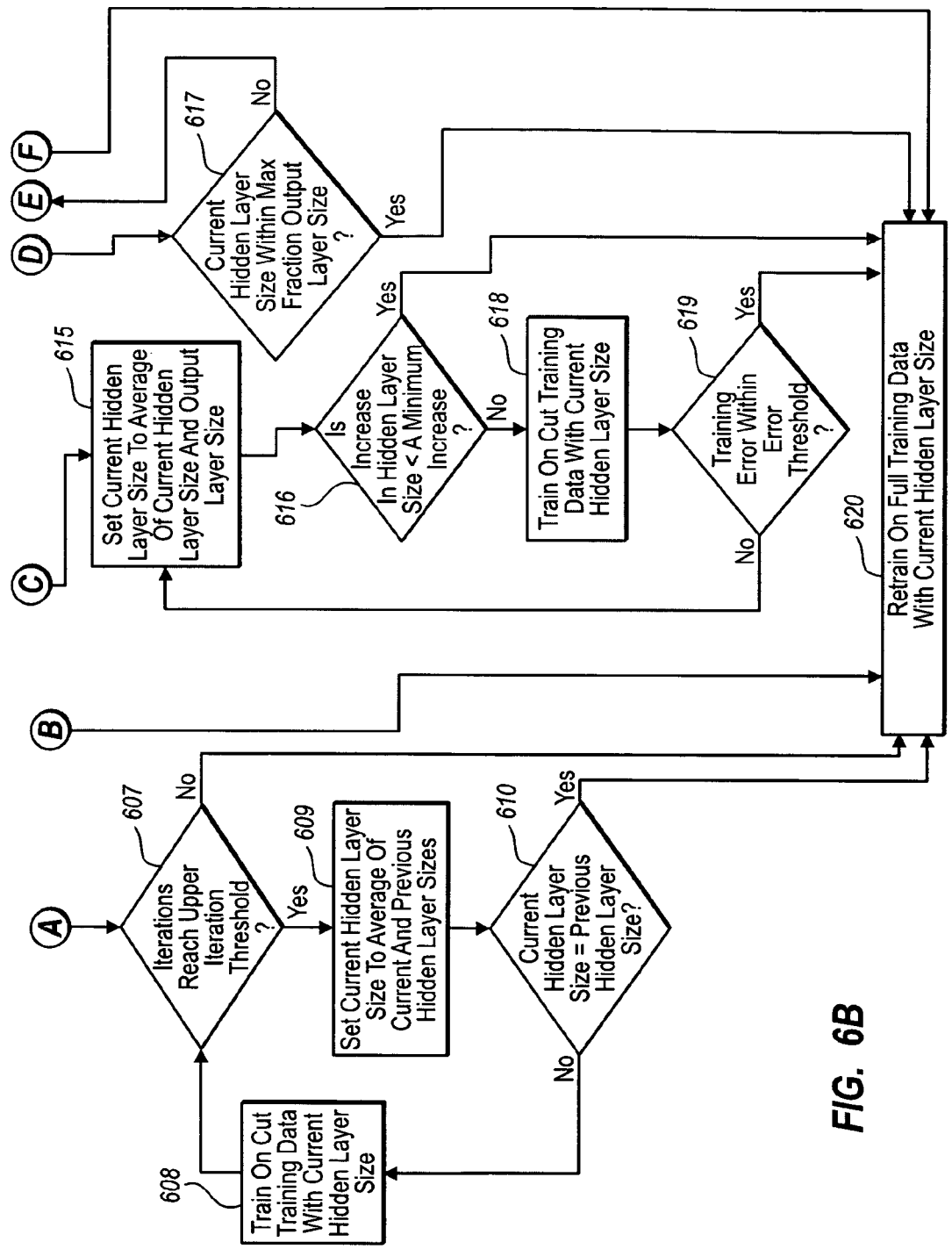

HSens. Hidden layer size sensitivity for the bottom loop. When the hidden layer size difference of now vs. previous is below HSens (e.g., 10) the final 'full' set training is performed FIG. 6 illustrates a flow chart of an example method 600 for automated hidden layer sizing and training. The hidden layer size search algorithm of act 310 can utilize method 600 or other similar methods for optimizing a hidden layer size. Method 600 will be described with response to the components and in FIG. 2B.

Generally, hidden layer size algorithm can be separated into two parts: hidden layer size convergence after a reduction from an initial hidden layer size and hidden layer size convergence after an increase from the initial hidden layer size.

The hidden layer size is reduced when the current size learns the cut training data in less than InitIterThres iterations. Reduction can continue until either it is less than or equal to some minimum hidden layer size or more than InitIterThres is needed. In the latter case, the hidden layer size is selected if the NN converges in less than InitTrnIterations and is increased based on the last size if not. In the latter case, the size is selected if the NN converges in less than InitTrnIterations and is increased to the last size if not. This continues until the hidden layer is selected.

A second portion of the algorithm increases the hidden layer size if cut set training stops at InitTrnIterations. In this case, retraining is performed with hidden layer increased from current to previous size. If the retraining still takes the full InitTrnIterations, then the hidden layer size is increased again. This continues until the hidden layer size is greater that the MaxFraction of the output layer or the full InitTrnIterations are not used. In the former case this hidden layer size is selected. In the latter case, the hidden layer size is reduced to insure that it is not too large.

If the training RMS error is greater than or equal the InitTrnError, then select this hidden layer size. If not, then the training stopped before the InitTrnIterations was reached, so the hidden layer size is reduced again. If this difference is less than HSens, then select this hidden layer size. Once the hidden layer size has been selected, train on the full training data files using the final training parameters, for example, input by a user.

Method 600 includes an act of training on cut data with current hidden layer size initialized to a percentage of the output layer size (act 601). For example, when calculating a hidden layer size for group 253, hidden layer size training module 248 can train on cut training data 243 with current Hsize initialized to half (e.g., 25) of the output layer size. The output layer size (e.g., 50) can also be indicated in cut training data 243.

Method 600 includes an act of determining if the number of iterations for a training run is less than InitIterThres (decision block 602). For example, hidden layer training size module 248 can determine if the number of iterations is less than 50. If the answer at decision block 602 is YES, method 600 includes an act of reducing the current hidden layer size by a specified factor (act 603). For example, hidden layer training size module 248 can reduce the current Hsize in half (multiplied by 0.5) to 12 (or 13). Subsequent to act 603, method 600 includes an act of determining if the current hidden layer size is less than the minimum hidden layer size threshold (decision block 604). For example, hidden layer training size module 248 can determine if the current Hsize is less than 2. However, somewhat larger minimum hidden layer size thresholds can be used.

If the answer at decision block 604 is YES, method 600 includes an act of retraining on the full training data with the current hidden layer size (act 620). For example, hidden layer training size module 248 can train on full training data 242 with Hsize=2. On the other hand, if the answer at decision block 604 is NO, method 600 includes an act of training on the cut training data with the current hidden layer size (act 605). For example, hidden layer training size module 248 can train on cut training data 243 with Hsize=12 (or 13)

Subsequent to act 605, method 600 includes an act of determining if the number of iterations is less than InitIterThres (decision block 606). For example, hidden layer training size module 248 can determine if the number of iterations is less than 50. If the answer at decision block 606 is YES, method 600 includes an act of reducing the current hidden layer size by a specified factor (act 603). For example, hidden layer training size module 248 can reduce the current Hsize in half (multiplied by 0.5) to 6 (or 7). If the answer at decision block 602 is NO, method 600 includes determining if the number of iterations has reached InitTrnIterations (decision block 607). For example, hidden layer training size module 248 can determine if the number of iterations has exceeded 200.

Returning back to decision block 602, if the answer at decision block 602 is NO, method 600 includes an act of determining if the training error is with an error threshold (decision block 611). For example, hidden layer training size module 248 can determine if the training error is less than 0.01. If the answer at decision block 611 is YES, method 600 includes an act of retraining on the full training data with the current hidden layer size (act 620). For example, hidden layer training size module 248 can train on full training data 242 with Hsize=25.

On the other hand, if the answer at decision block 611 is NO, method 600 includes an act of setting (increasing) the current hidden layer size to the average of the current hidden layer size and the output layer size (act 612). For example, hidden layer training size module 248 can set Hsize=(Hsize+Output layer size)/2, or (25+50/2=37 (or 38). Method 600 then includes an act of training on the cut data with the current hidden layer size (act 613). For example, hidden layer training size module 248 can train on cut data 243 with Hsize=37 (or 38).

Subsequent to act 613, method 600 includes an act of determining an act of determining if the training error is with an error threshold (decision block 614). For example, hidden layer training size module 248 can determine if the training error is less than 0.01. If the answer at decision block 614 is NO, method 600 includes an act of determining if the current hidden layer size is within MaxFraction of the output layer size (decision block 617). For example, hidden layer training size module 248 can determine of Hsize is within 90% of the output layer size.

If the answer at decision block 617 is NO, method 600 returns to act 612. For example, hidden layer training size module 248 can again set the hidden layer size to the average of the hidden layer size and the output layer size. On the other hand, if the answer at decision block 617 is YES, method 600 proceeds to act 620 for retraining on the full training data.

Returning to decision block 614, if the answer at decision block. 614 is YES, method 600 includes an act of setting (increasing) the current hidden layer size to the average of the current hidden layer size and the output layer size (act 615). For example, hidden layer training size module 248 can set Hsize=(Hsize+Output layer size)/2, or (37 (or 38)+50)/2=43 (or 44). Method 600 includes an act of determining if the increase in hidden layer size is less than a minimum increase (decision block 616). If the answer at decision block 616 is NO, method 600 includes an act of training on the cut data with the current hidden layer size (act 618). For example, hidden layer training size module 248 can train on cut data 243 with Hsize=43 (or 44). On the other hand, if the answer at decision block 616 is YES, method 620 proceeds to act 620 for retraining on the full training data.

Method 600 includes an act of determining if the training error is with an error threshold (decision block 619). For example, hidden layer training size module 248 can determine if the training error is less than 0.01. If the answer at decision block 619 is NO, method 600 returns to act 615 to set (increase) the current hidden layer size to the average of the current hidden layer size and the output layer size. On the other hand the answer at decision block 619 is YES, method 600 proceeds to act 620 for retraining on the full training data.

Returning to decision block 607, if the answer at decision block 607 is NO, method 600 proceeds to act 620 for retraining on the full training data. On the other hand, if the answer at decision block 607 is YES, method 600 includes an act of setting the current hidden layer size to the average of the current and the previous hidden layer size (act 609). For example, hidden layer training size module 248 can set Hsize=(12 (or 13)+25)/2=18 (or 19).

Method 600 includes an act of determining if the current hidden layer size equals the previous hidden layer size (decision block 610). If the answer at decision block 610 is YES, method 600 proceeds to act 620 for retraining on the full training data. On the other hand, if the answer at decision block 610 is NO, method 600 includes an act of training on the cut data with the current hidden layer size (act 608). For example, hidden layer training size module 248 can train on cut data 243 with Hsize=18 (or 19). Method 600 can then return to decision block 607.

Accordingly, an intermediate calculation of method 600 can include calculated a hidden layer node size from cut training data 243. For example, hidden layer training size module 248 can calculate hidden layer nodes 249C. Hidden layer nodes 249C can be input back into hidden layer training size module 248 to assist in calculating hidden layer nodes 249F (based on full training data 242).

Thus, retraining on full training data 242 (act 620) can include refining hidden layer nodes 249C based on full training data 242 and FinalTrnIterations and FinalTrnError. The use of FinalTrnIterations permits more iterations to be performed before conceded no further optimizations can be made. The use of FinalTrnError requires the final hidden layer to be more accurate relative to the hidden layer calculated from the cut training data. In some embodiments, a method similar to method 600 is used to calculate the hidden layer nodes 249F based on the full training data. However, other algorithms can also be used.

Accordingly, hidden layer sizing for the baseline InitTrnError can be reduced if the frequency measurands is not used. With everything else constant, lower required Initial Training Error tends to achieve larger hidden layer sizes having less training error. A smaller FinalTrnError can be used to achieve better convergence especially on the smaller or nearly constant groups. On some larger and/or harder to train groups the InitTrnIterations limit (e.g., 200) can be reached first. Then the hidden layer sizing algorithm can then determine how much larger the hidden layer is to be. Hidden layer sizing can achieve the knee-of-the-curve in performance versus complexity.

Returning to method 300, neural network configuration includes an act of selecting the number of output layer nodes for the output layer of the neural network (act 311). For example, hidden layer size training module 248 can access an output layer size from training data 243 or 242. Neural network configuration includes an act of assigning one or more connections between input layer nodes and hidden layer nodes (act 312). Neural network configuration includes an act of assigning one or more connections between the hidden layer nodes and the output layer nodes (act 313). For example, hidden layer nodes 249C and 249F can also include weights that are to be used for connections between input layer nodes and hidden layer nodes and between hidden layer nodes and output layer nodes Hidden layer nodes 249F can be included in a neural network for group 253. For example, hidden layer nodes 249F can be included in neural network 253N. In some embodiments, hidden layer nodes 249F are calculated for an Independent Component Analysis ("ICA") neural network. For example, neural network 253N can be an ICA neural network.

Figure 2C:
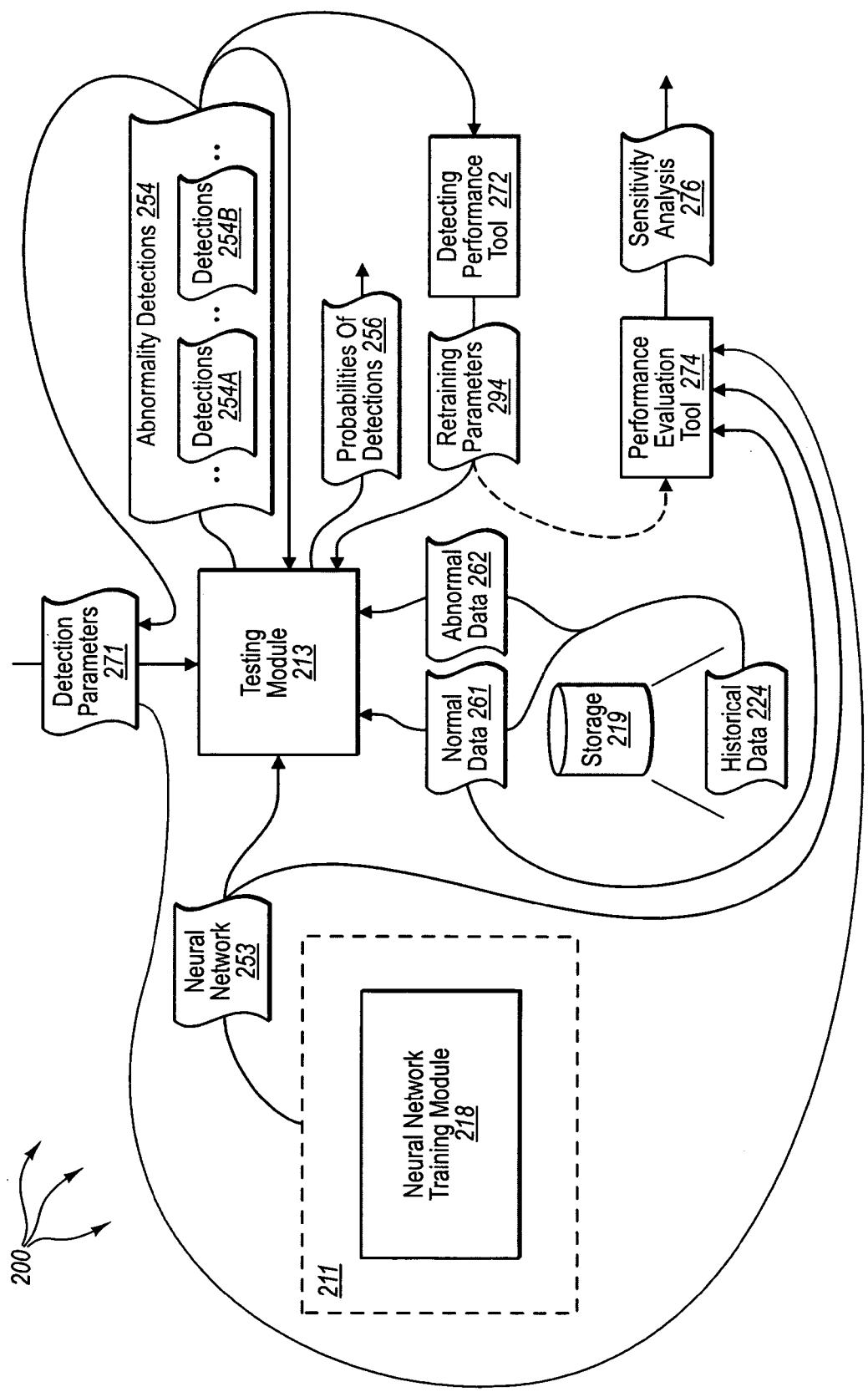
FIG. 2C illustrates another view of the example computer architecture in FIG. 2A that facilitates configuring neural networks for remotely monitoring the performance of a system.

FIG. 2C illustrates another view of the example computer architecture 200 that facilitates configuring neural networks for remotely monitoring the performance of a system. Referring now to FIG. 2C, subsequent to creation of a neural network (e.g., per group in measurand groups 251), the neural network can be configured to detect abnormalities during performance (past or present) of a monitored system. For example, neural network 253 can be loaded at testing module 213 and run against normal data 261 and abnormal data 262 from historical data 224. From the data, testing module can generate abnormality detection thresholds and a false alarm rate. Detection parameters 271 can be used to regulate how neural networks, such as, for example, neural network 253 are tested.

FIG. 2C also depicts detection performance tool 272. Generally, detection performance tool 272 is configured to detect how testing module 213 is performing and, when appropriate, provide retraining parameters back to testing module 213. For example, detection performance tool 272 can provide retraining parameters 294 back to testing module 213. Testing module 213 can use retraining parameters 294 to reconfigure tests and/or retraining neural networks. Detection performance tool 272 can also provide retraining parameters (e.g., provide retraining parameters 294) to performance evaluation tool 274.

Generally, performance evaluation tool 274 is configured to evaluate the performance of neural networks and analyze the sensitivity with which abnormalities are being detected. For example, performance evaluation tool 274 can receive detection parameters 271, neural network 253, normal data 261, and optionally retraining parameters. From detection parameters 271, neural network 253, normal data 261, and optionally retraining parameters, evaluation tool 274 can generate sensitivity analysis 276. Sensitivity analysis 276 can indicate if the detection of abnormalities is too sensitive (and, for example, the number of detections is overloading a human operator) or is not sensitive enough (and, for example, the number of detections is inadequate to provide any meaningful data about the performance of system 201).

From sensitivity analysis 276, the sensitivity of individual measurands can be adjusted to regulate the number and/or type of abnormality detections. Individual measurand sensitivity values can be adjusted (e.g., during off-line training) to meet user desired detection enhancement or de-sensitization. For example, individual measurand sensitivity values can be automatically adapted to suppress undesired repeating abnormality detections (while also retaining sensitivity for other abnormality defections based on the same operands).

Modules in network architecture 200 (e.g., testing module 213) can also classify abnormality detections into clusters. For example, testing module 213 can classify abnormality detections 254 into classification clusters 277 (depicted in FIG. 2D). Detections can be classified based on similarities between abnormality signatures. Accordingly, when real-time data from the monitored system (e.g., telemetry 223) is processed, abnormal events occurring at the monitored system can be detected in real-time.

Figure 4:
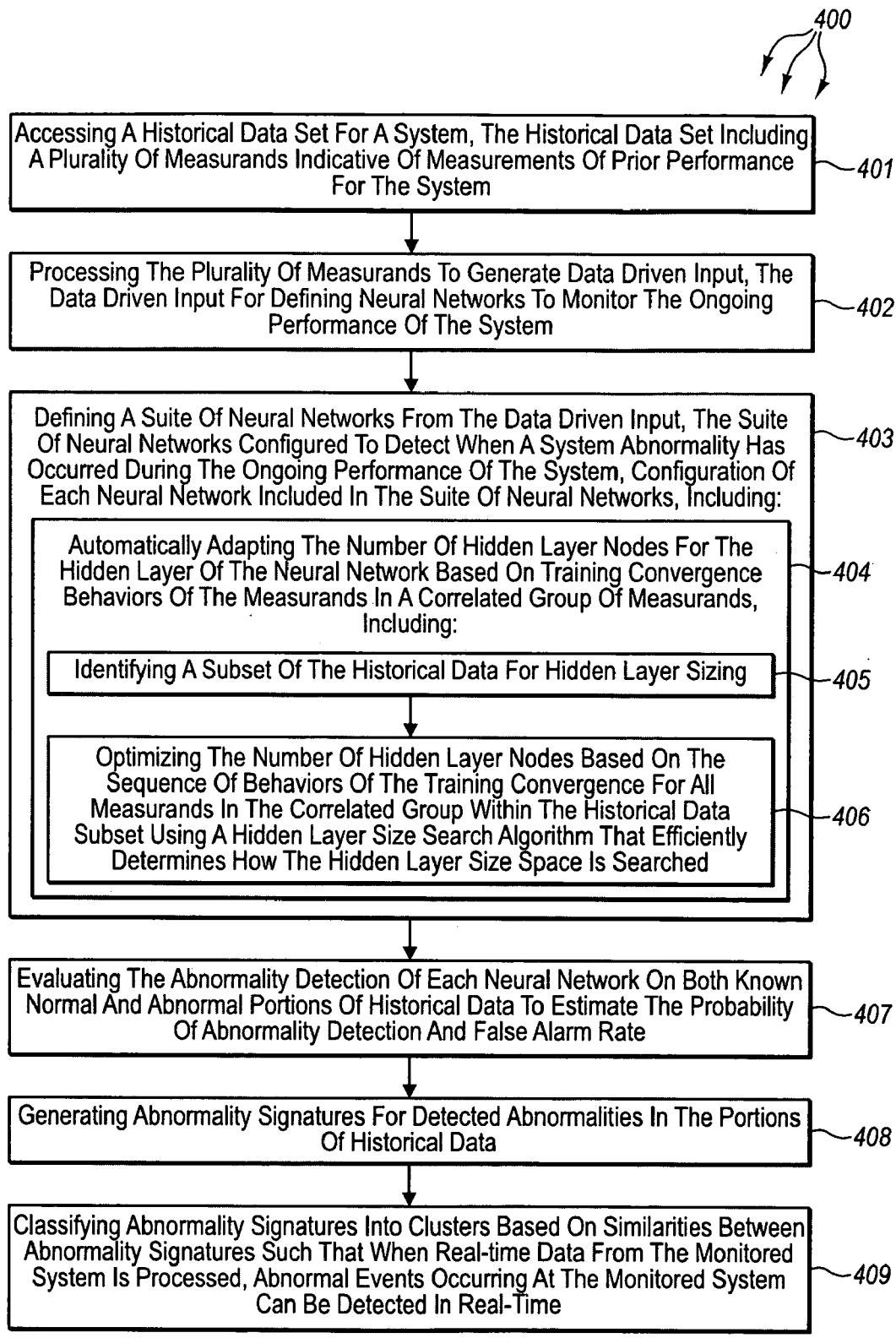
FIG. 4 illustrates a flow chart of an example method for configuring neural networks to detect abnormalities during performance of a monitored system.

FIG. 4 illustrates a flow chart of an example method 400 for configuring neural networks to detect abnormalities during performance of a monitored system. Method 400 will be described with respect to the components and data of architecture 200.

Method 400 includes an act of accessing a historical data set for a system, the historical data set including a plurality of measurands indicative of measurements of prior performance for the system (act 401). For example, referring to FIG. 2A, neural network creation tools 211 an access behavior data 227. Method 400 includes an act of processing the plurality of measurands to generate data driven input, the data driven input for defining neural networks to monitor the ongoing performance of the system (act 402). For example, various modules of neural network creation tools 211 can process behavior data 227, full training files 232, cut set training files 233, and training parameters 222, into data driven input to neural network training module 218.

Referring now to FIG. 2B, method 400 includes an act of defining a suite of Independent Component Analysis (ICA) neural networks from the data driven input, the suite of Independent Component Analysis (ICA) neural networks configured to detect when a system abnormality has occurred during the ongoing performance of the system, configuration of each Independent Component Analysis (ICA) neural network included in the suite of Independent Component Analysis (ICA) neural networks (act 403). For example, neural network training module 218 can define a suite of ICA neural networks for measurand groups 251, including neural network 253N for group 253. The suite of neural networks can be used to detect abnormalities in the performance of system 201. ICA networks can be configured with the same number of inputs as outputs. In this embodiment, ICA networks can be extended to allow additional inputs that aid in the detection process.

For each ICA neural network, method 400 includes an act of automatically adapting the number of hidden layer nodes for the hidden layer of the Independent Component Analysis (ICA) neural network based on training convergence behaviors of the measurands in a correlated group of measurands (act 404). For example, hidden layer sizing module 248 can automatically adapt the number of hidden layer nodes for the hidden layer of neural network 253N from convergence behaviors of measurands in group 253.

Hidden layer node adaptation includes an act of identifying a subset of the historical data for hidden layer sizing (act 405). For example, hidden layer sizing module 248 identify cut training data 243 and then full training data 242 for use in hidden layer sizing. Hidden layer node adaptation includes an act of optimizing the number of hidden layer nodes based on the sequence of behaviors of the training convergence for all measurands in the correlated group within the historical data subset using a hidden layer size search algorithm that efficiently determines how the hidden layer size space is searched (act 406). For example, hidden layer sizing module 248 can optimize hidden layer nodes 249F based on the sequence of behaviors of the training convergence for all measurands in the group 251.

Turning back to FIG. 2C, method 400 includes an act of evaluating the abnormality detection of each Independent Component Analysis (ICA) neural network on both known normal and abnormal portions of historical data to estimate the probability of abnormality detection and false alarm rate (act 407). For example, neural network 253 can be loaded at testing module 213. Testing module 213 can 124 evaluate the abnormality detection of neural network 253 (and neural networks for other groups in measurand groups 251) against normal data 261 and abnormal data 262. From the evaluation, testing module 213 can estimate abnormality detections 254 (e.g., 254A, 254B, etc.) and probability of detections 256. Abnormality detections 254 can also be used as feedback to adjust detection parameters 271 and/or the operation of testing module 213.

Method 400 includes an act of generating abnormality signatures for detected abnormalities in the portions of historical data (act 408). For example, testing module 213 can generate abnormality signatures for detected abnormalities in historical data 224. Method 400 includes an act of classifying abnormality signatures into clusters based on similarities between abnormality signatures such that when real-time data from the monitored system is processed, abnormal events occurring at the monitored system can be detected in real-time (act 409). For example, testing module 213 can classify signatures into classification clusters 277 based on similarities between abnormality signatures in abnormality detections 254. Accordingly, when real-time data from system 201 is processed, abnormal events occurring at system 201 can be detected in real-time.

Figure 2D:
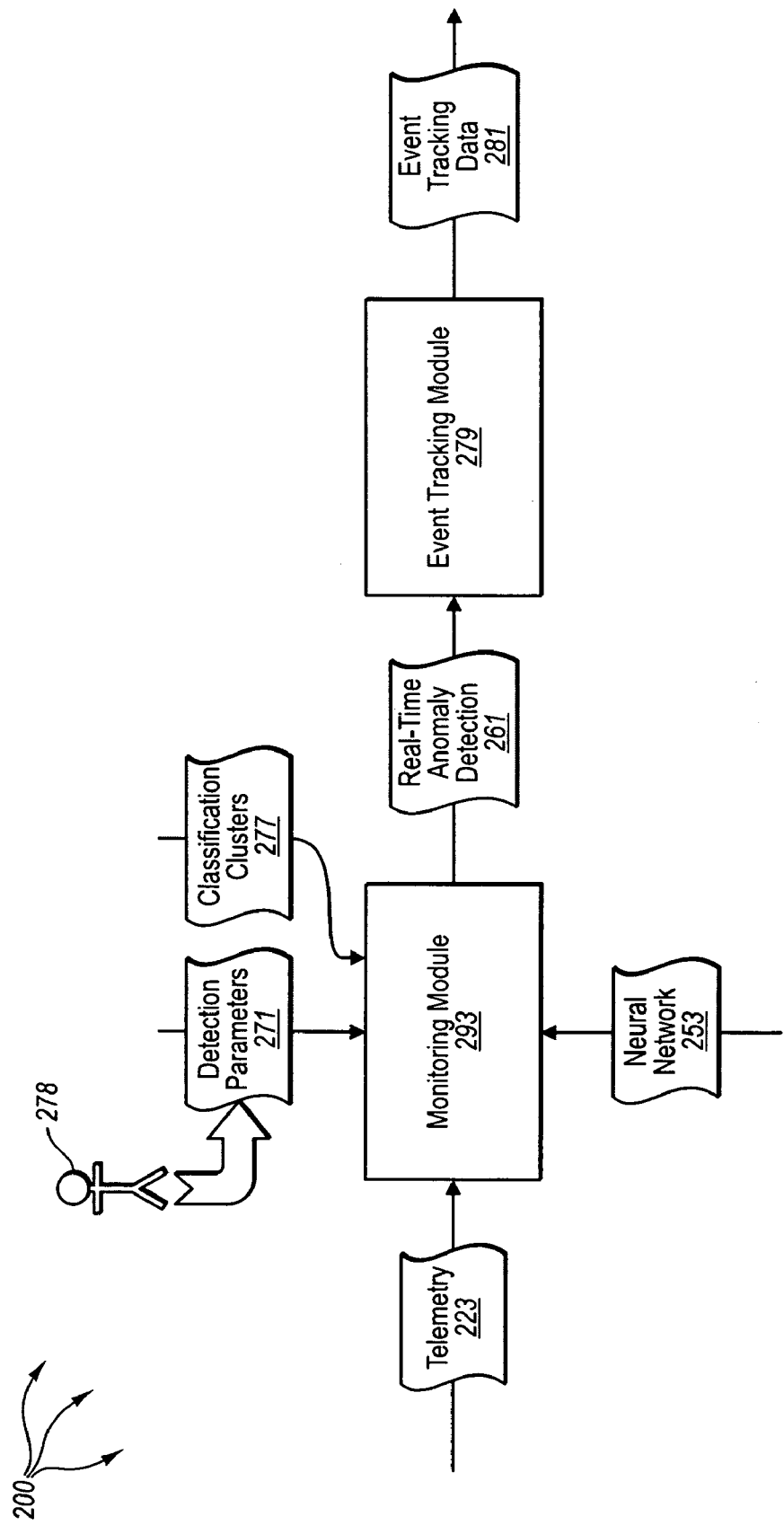
FIG. 2D illustrates another view of the example computer architecture in FIG. 2A that facilitates configuring neural networks for remotely monitoring the performance of a system.

After training and configuration, a trained set of neural networks can be applied to a new data set or real-time data where reports of abnormalities are produced from the new data set. For example, after training and configuration, a suite of ICA neural networks can be deployed to monitor system performance in real-time. FIG. 2D illustrates another view of the example computer architecture 200 facilitates configuring neural networks for remotely monitoring the performance of a system. For example, a suite of ICA neural networks, including neural network 253, and neural networks for other groups in measurand group 251 can be loaded at monitoring module 293. Once loaded, the suite of ICA neural networks can monitor telemetry 223 in real-tine to detect possible anomalies in the performance of system 201. The suite of ICA neural networks can report when anomalies and/or abnormalities are detected in performance of system 201.

Generally, monitoring module 213 can apply telemetry 223 to neural network 253, in view of detection parameters 271 and classification clusters 277, to detect real-time anomalies, such as, for example, real-time anomaly 261. User 278 can refine detection parameters 271 to adjust monitoring of telemetry 223 as appropriate. Refinements detection parameters 271 can be made to achieve a desired level of detections rates for each measurand.

Generally, event tracking module 279 can receive detected real-time anomalies and/or abnormalities from monitoring module 293. For example, event tracking module 279 can receive a report of real-time anomaly 261 from monitoring module 213. Event tracking module 270 can track events based on one or more real-time anomalies and/or abnormalities. For example, in combination with one or more other real-time anomalies, event tracking module 270 can generate event tracking data 281 for system 201. Event tacking data 281 can indicate events that are occurring (or are potentially going to occur) at system 201.

Event tracking data 181 can be used to correlate (statically and temporally) anomaly and/or abnormality detections with truth historical events used to assign causes to abnormality detections. Event tracking data 181 can also be used to estimate abnormal event start, stop, and classification states and their uncertainty.

Figure 5:
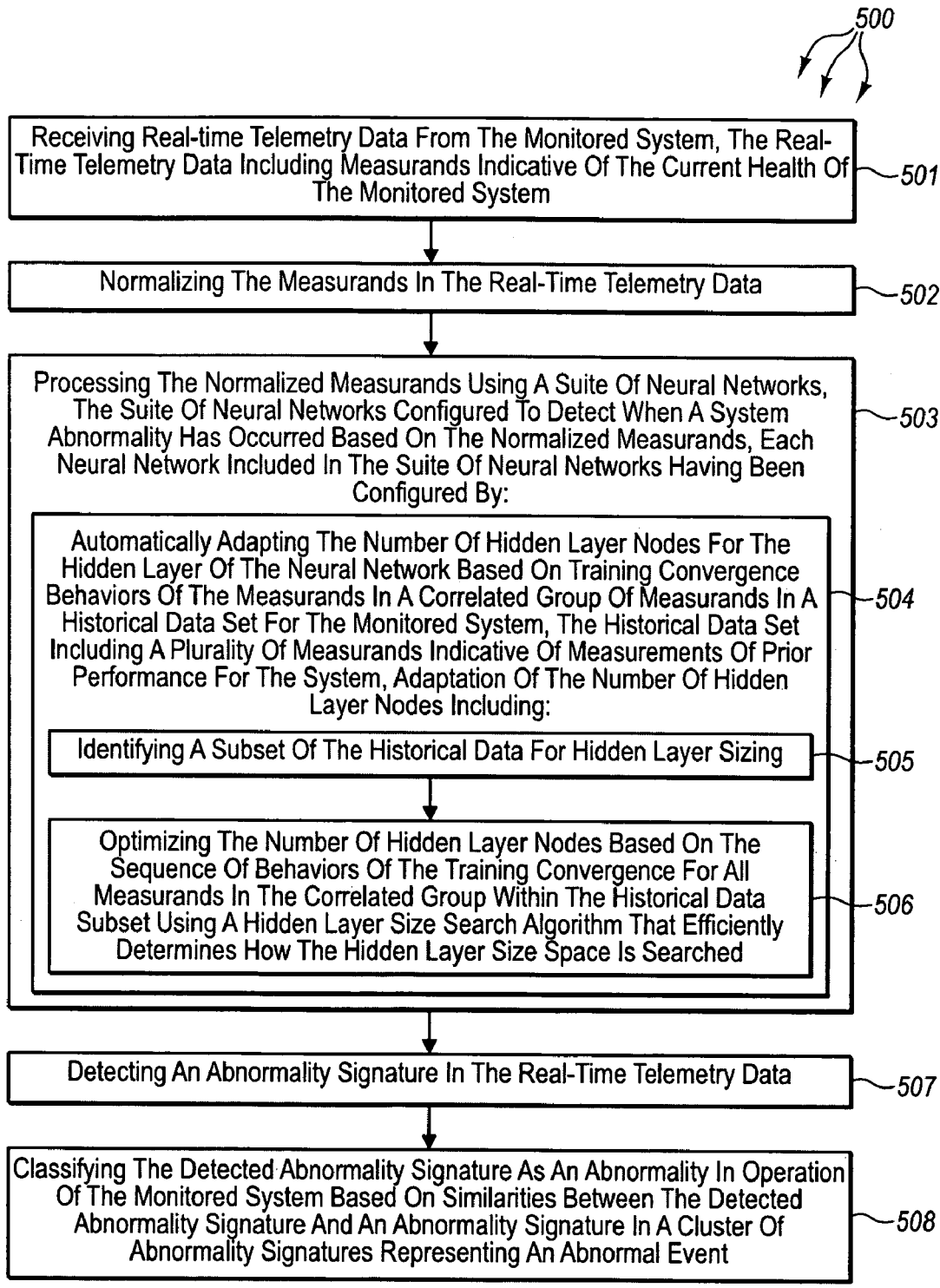
FIG. 5 illustrates a flow chart of an example method for utilizing neural networks to detect abnormalities during performance of a monitored system.

FIG. 5 illustrates a flow chart of an example method 500 for utilizing neural networks to detect abnormalities during performance of a monitored system. Method 500 will be described with respect to the components and data of architecture 200.

Method 500 includes an act receiving real-time telemetry data from the monitored system, the real-time telemetry data including measurands indicative of the current health of the monitored system (act 501). For example, monitoring module 293 can receive telemetry 223 from system 201. Telemetry 223 includes measurands indicative of the current health of system 201.

Method 500 includes an act normalizing the measurands in the real-time telemetry data (act 502). For example, monitoring module 293 can normalize the measurands in telemetry 2223 for submission to a suite of ICA neural networks generated for each group in measurand groups 251, including for submission to neural network 253N for group 253.

Method 500 includes an act of processing the normalized measurands using a suite of Independent Component Analysis (ICA) neural networks, the suite of Independent Component Analysis (ICA) neural networks configured to detect when a system abnormality has occurred based on the normalized measurands (act 503). For example, the suite of ICA networks including neural network 253N can process telemetry 223 to detect any abnormalities at system 201. Normalization can include calculating one or more of a derived mean, standard deviation, slope, and frequency temporal measurands where the continuous, discrete, or constant type normalization.

Each Independent Component Analysis (ICA) neural network included in the suite of Independent Component Analysis (ICA) neural networks is configured by automatically adapting the number of hidden layer nodes for the hidden layer of the Independent Component Analysis (ICA) neural network based on training convergence behaviors of the measurands in a correlated group of measurands in a historical data set for the monitored system, the historical data set including a plurality of measurands indicative of measurements of prior performance for the system (act 504). For example, as previously described, neural network training module 218 can adapt a number of hidden layer nodes based on the convergence of behaviors in for measurands in measurand list 221 based on historical data 224. Accordingly, embodiments of the invention extend ICA methodology to allow additional inputs to the network to be used in training to improve the performance of the network.

Adaptation of the number of hidden layer nodes includes hidden layer size training module 248 identifying a subset of the historical data 224 for hidden layer sizing (act 505). Adaptation of the number of hidden layer nodes also includes hidden layer size training module 248 optimizing the number of hidden layer nodes 249F based on the sequence of behaviors of the training convergence for all measurands in the correlated groups 251 within the historical data 224 (act 506).

Method 500 includes an act of detecting an abnormality signature in the real-time telemetry data (act 507). For example, monitoring module 293, based on the outputs of an ICA neural network, can detect anomaly 261 in telemetry 223.

Method 500 includes classifying the detected abnormality signature as an abnormality in operation of the monitored system based on similarities between the detected abnormality signature and an abnormality signature in a cluster of abnormality signatures representing an abnormal event (act 508). For example, monitoring module 223 can classify real-time anomaly detection 261 as an abnormality in the performance of system 201 based on similarities to other abnormality signatures. In some embodiments, a non-linear abnormality classification algorithm is used to classify real-time anomalies.

In some embodiments, a next higher layer of neural networks is derived. For example, a next higher layer of neural networks can be derived from and trained using the hidden layer activations from the lower layer as training feedback. Accordingly, a smaller set of derived neural networks is yielded on top of the first set in a data-driven hierarchy of supervised neural networks. Deriving next high levels (e.g., third, fourth etc.) can be repeated desired until a top layer in the neural networks hierarchy is exactly one neural network. The resulting data driven hierarchy of neural networks, most of which are feed-forward and some of which may be recurrent neural networks, provides the basis for abnormality detection wherein all correlations between all measurands have been learned in a hierarchical architecture of neural networks.

Accordingly, embodiments of the invention include an integrated set of algorithms that enable an analyst to detect, characterize, and track abnormalities in real-time data streams based upon historical data labeled as predominantly normal or abnormal. Embodiments of the invention can detect, identify relevant historical contextual similarity, and fuse unexpected and unknown abnormal signatures with other possibly related sensor and source information. The number, size, and connections of the neural networks all automatically adapted to the data. Further, adaption appropriately and automatically integrates unknown and known abnormal signature training within one neural network architecture solution automatically. Algorithms and neural networks architecture are data driven. As a beneficial result, processing is more affordable than traditional expert model-driven approaches. Expert knowledge is incorporated via parameterization tools to enhance the process, but sufficient performance can be achieved without any system domain expert or neural networks expertise.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a method for adapting the neural architecture of neural networks to detect abnormalities in the operation of a monitored system, the method comprising:
   an act of accessing a historical data set for a system, the historical data set including a plurality of monitored measurands indicative of measurements of prior performance for the system, the plurality of measurands for use in training neural networks to monitor the ongoing performance of the system;
   for each measurand:
      an act of automatically determining the measurand type of the measurand from the historical data, the measurand type selected from among: continuous, discrete, and constant; and
      an act of automatically scaling and normalizing the measurand based upon the behavior of one or more of: the maximum value, the minimum value, the mean value, the standard deviation value, the slope value, and the frequency value for the measurand over user selected temporal windows in the historical data;
   an act of configuring and training a set of neural networks to detect abnormal events in the monitored measurands, including for each neural network in the set of networks:
   an act of configuring the neural network to monitor the system for abnormalities related to the correlated group of measurands subsequent to scaling and normalizing the measurands, configuring the neural network in layers including:
      an act of selecting the number of the input layer nodes for the input layer of neural network;
      an act of automatically adapting the number of hidden layer nodes for the hidden layer of the neural network based on training convergence behaviors of the neural networks of the measurands in the correlated group of measurands, including:
         an act of identifying a subset of the historical data for hidden layer sizing; and
         an act of optimizing the number of hidden layer nodes based on the sequence of behaviors of the neural networks training convergence for all measurands in the correlated group within the historical data subset using a hidden layer size search algorithm that efficiently determines how the hidden layer size space is searched;
      an act of selecting the number of output layer nodes for the output layer of the neural network;
      an act of assigning one or more connections between input layer nodes and hidden layer nodes; and
      an act of assigning one or more connections between hidden layer nodes and output layer nodes; and
   an act of applying the trained set of neural networks to a new data set or real-time data where reports of abnormalities are produced from the new data set.

2. The method as recited in claim 1, wherein configuring the neural networks includes grouping measurands comprising
   an act of computing correlations between different measurands in the historical data set, including normal, abnormal, and unknown data behavior;
   an act of using the correlations to automatically gather measurands together into one or more groups to facilitate automated neural network architecture configuration and training.

3. The method as recited in claim 1, further comprising an act of a user pre-grouping of one or more measurands such that the one or more measurands are precluded from automated grouping, the user pre-grouping the one or more measurands prior to automatically gather measurands together into one or more groups.

4. The method as recited in claim 1, further comprising for each correlated group of measurands calculating measurand statistics and temporal measurand selection from among standard deviation, slope, frequency, and mean over a user selected time window.

5. The method as recited in claim 4, further comprising receiving a user selection of additional measurands over a range of time spans.

6. The method as recited in claim 5, wherein the user selection of additional measurands includes a user selection of one or more of the sine and cosine of time over a range of time spans.

7. The method as selected in claim 6, wherein the act of selecting the number of the input layer nodes comprises an act of selecting the number of input layer nodes based on the measurand statistics, the temporal measurand selection, and the user selected additional measurands; and
   wherein the act of selecting the number of output layer nodes comprises an act of selecting the number of output layer nodes based on the measurand statistics, the temporal measurand selection, and the user selected additional measurands.

8. The methods as recited in claim 1, wherein monitored system is part of a moving object in orbit around the earth.

9. The methods as recited in claim 1, wherein for each correlated group of measurands, an act of configuring a neural network to monitor the system comprises for each group of measurands configuring an Independent Component Analysis (ICA) neural network to monitor the system.

10. The method recited in claim 9 wherein the ICA neural network is augmented with additional input variables to augment the neural network performance.

11. The methods a recited in claim 1, wherein the reports generated identifying abnormalities are augmented by an abnormality classification means comprising:

an act of configuring and training a neural network to cluster abnormality results into a set of abnormality classes;

an act of classifying and labeling the detected abnormality signature as an abnormality in operation of the monitored system based on similarities between the detected abnormality signature and an abnormality signature in a cluster of abnormality signatures representing an abnormal event; and an act of augmenting the report with the labeled class of the abnormality cause.

12. The methods as recited in claim 1, wherein the monitored system is a system selected from among the list of systems including: a factory system, an agricultural system, a motor vehicle system, a medical system, a radar system, a satellite system, a rocket system, an aircraft system, a maritime system, and a defense system.

13. At a computer system including one or more processors and system memory, a method for configuring neural networks to detect abnormalities during performance of a monitored system, the method comprising:

an act of accessing a historical data set for a system, the historical data set including a plurality of measurands indicative of measurements of prior performance for the system;

an act of processing the plurality of measurands to generate data driven input, the data driven input for defining neural networks to monitor the ongoing performance of the system;

an act of defining a suite of Independent Component Analysis (ICA) neural networks from the data driven input, the suite of Independent Component Analysis (ICA) neural networks configured to detect when a system abnormality has occurred during the ongoing performance of the system, configuration of each Independent Component Analysis (ICA) neural network included in the suite of Independent Component Analysis (ICA) neural networks, including:

an act of automatically adapting the number of hidden layer nodes for the hidden layer of the Independent Component Analysis (ICA) neural network based on training convergence behaviors of the measurands in a correlated group of measurands, including:

an act of identifying a subset of the historical data for hidden layer sizing; and an act of optimizing the number of hidden layer nodes based on the sequence of behaviors of the training convergence for all measurands in the correlated group within the historical data subset using a hidden layer size search algorithm that efficiently determines how the hidden layer size space is searched;

an act of evaluating the abnormality detection of each Independent Component Analysis (ICA) neural network on both known normal and abnormal portions of historical data to estimate the probability of abnormality detection and false alarm rate;

an act of generating abnormality signatures for detected abnormalities in the portions of historical data; and an act of classifying abnormality signatures into clusters based on similarities between abnormality signatures such that when real-time data from the monitored system is processed, abnormal events occurring at the monitored system can be detected in real-time.

14. The methods as recited in claim 13, wherein the historical data is for a system that is part of a moving object in orbit around the earth.

15. The method as recited in claims 13, further comprising for the correlated group of measurands calculating measurand statistics and temporal measurand selection from among standard deviation, slope, frequency, and mean over a user selected time window.

16. At a computer system including one or more processors and system memory, a method for utilizing neural networks to detect abnormalities during performance of a monitored system, the method comprising:

an act of receiving real-time telemetry data from the monitored system, the real-time telemetry data including measurands indicative of the current health of the monitored system;

an act of normalizing the measurands in the real-time telemetry data;

an act of processing the normalized measurands using a suite of Independent Component Analysis (ICA) neural networks, the suite of Independent Component Analysis (ICA) neural networks configured to detect when a system abnormality has occurred based on the normalized measurands, each Independent Component Analysis (ICA) neural network included in the suite of Independent Component Analysis (ICA) neural networks having been configured by:

an act of automatically adapting the number of hidden layer nodes for the hidden layer of the Independent Component Analysis (ICA) neural network based on training convergence behaviors of the measurands in a correlated group of measurands in a historical data set for the monitored system, the historical data set including a plurality of measurands indicative of measurements of prior performance for the system, adaptation of the number of hidden layer nodes including:

an act of identifying a subset of the historical data for hidden layer sizing; and an act of optimizing the number of hidden layer nodes based on the sequence of behaviors of the training convergence for all measurands in the correlated group within the historical data subset using a hidden layer size search algorithm that efficiently determines how the hidden layer size space is searched;

an act of detecting an abnormality signature in the real-time telemetry data; and an act of classifying the detected abnormality signature as an abnormality in operation of the monitored system based on similarities between the detected abnormality signature and an abnormality signature in a cluster of abnormality signatures representing an abnormal event.

17. The methods as recited in claim 16, further comprising an act of deriving the next higher layer neural networks which are trained using the hidden layer activations from the lower layer with some used a plurality of times as training feedback such that a smaller set of derived neural networks is yielded on top of the first set in a data-driven hierarchy of supervised neural networks.

18. The method as recited in claim 16, further comprising repeating derivation of next higher levels until the top layer in the neural networks hierarchy is exactly one neural network.

19. The method as recited in claim 16, further comprising an act adjusting the sensitivity of one or more measurands used to detect the abnormality signature.

20. The method as recited in claim 19, wherein the act adjusting the sensitivity of one or more measurands used to detect the abnormality signature comprises an act of adapting sensitivity values of one or more measurands to suppress repeating abnormality detections.

21. The method as recited in claim 19, wherein the act adjusting the sensitivity of one or more measurands used to detect the abnormality signature comprises an act of adapting sensitivity values of one or more measurands to enhance detection of the abnormality signature.

22. The method as recited in claims 16, wherein an act of classifying the detected abnormality signature as an abnormality in operation of the monitored system comprises an act of using a non-linear abnormality classification algorithm to classify real-time anomalies.

23. The method as recited in claim 16, further comprising using classifying the detected abnormality signature to track an event at the monitored system.

* * * * *